United States Patent
Andersen

(10) Patent No.: US 11,960,561 B2
(45) Date of Patent: Apr. 16, 2024

(54) CLIENT-SIDE GENERATION OF LOSSLESS OBJECT MODEL REPRESENTATIONS OF DYNAMIC WEBPAGES

(71) Applicant: Siteimprove A/S, Copenhagen (DK)

(72) Inventor: Nicolai Munch Andersen, Copenhagen (DK)

(73) Assignee: Siteimprove A/S, Copenhagen (DK)

( * ) Notice: Subject to any disclaimer, the term of this patent is extended or adjusted under 35 U.S.C. 154(b) by 0 days.

(21) Appl. No.: 17/876,027

(22) Filed: Jul. 28, 2022

(65) Prior Publication Data

US 2024/0037174 A1 Feb. 1, 2024

(51) Int. Cl.
*G06F 16/958* (2019.01)
*G06F 16/951* (2019.01)
*G06F 16/957* (2019.01)

(52) U.S. Cl.
CPC .......... *G06F 16/958* (2019.01); *G06F 16/951* (2019.01); *G06F 16/9574* (2019.01)

(58) Field of Classification Search
CPC ... G06F 16/958; G06F 16/951; G06F 16/9574
See application file for complete search history.

(56) References Cited

U.S. PATENT DOCUMENTS

| | | |
|---|---|---|
| 836,414 A | 11/1906 | Toles |
| 6,360,235 B1 | 3/2002 | Tilt |
| 7,231,606 B2 | 6/2007 | Miller et al. |
| 7,475,067 B2 | 1/2009 | Clary et al. |
| 7,558,795 B2 | 7/2009 | Malik et al. |
| 7,584,435 B2 | 9/2009 | Bailey et al. |
| 7,797,200 B2 | 9/2010 | Patrawala |
| 7,805,428 B2 | 9/2010 | Batista et al. |
| 8,065,410 B1 | 11/2011 | Breen et al. |
| 8,196,104 B2 | 6/2012 | Cohrs et al. |
| 8,447,751 B2 | 5/2013 | Stouffer et al. |
| 8,533,684 B2 | 9/2013 | Brunet et al. |

(Continued)

FOREIGN PATENT DOCUMENTS

WO   WO 2012/027022   3/2012

OTHER PUBLICATIONS

U.S. Appl. No. 17/672,222, Andersen et al.

(Continued)

*Primary Examiner* — Dangelino N Gortayo
(74) *Attorney, Agent, or Firm* — Barnes & Thornburg LLP

(57) ABSTRACT

The disclosed technology provides for generating a lossless representation of a webpage on a client device. A method can include rendering, by a client device, a webpage to be presented in a web browser at the client device, receiving an indication of user input to run a content check on the rendered webpage, calling, in response to receiving the indication of user input, a scraping function to scrape a document object model ("DOM") of the rendered webpage in the web browser at the client device, generating a lossless representation of the scraped DOM of the rendered webpage, and transmitting, to a web content analysis system, the lossless representation of the scraped DOM to be used when running the content check for the rendered webpage. The lossless representation of the scraped DOM can be a flat object model ("FlatOM") of the DOM of the rendered webpage.

20 Claims, 12 Drawing Sheets

(56) References Cited

U.S. PATENT DOCUMENTS

| | | | |
|---|---|---|---|
| 8,554,698 | B2 | 10/2013 | Bando et al. |
| 8,613,039 | B2 | 12/2013 | Chen et al. |
| 8,972,379 | B1 | 3/2015 | Grieselhuber et al. |
| 9,009,784 | B2 | 4/2015 | Chen et al. |
| 9,087,035 | B1 | 7/2015 | Bandaru et al. |
| 9,152,729 | B2 | 10/2015 | Ajoku et al. |
| 9,274,932 | B2* | 3/2016 | Crossley ............. G06F 11/3664 |
| 9,537,732 | B2 | 1/2017 | Mukherjee et al. |
| 9,563,422 | B2 | 2/2017 | Cragun et al. |
| 10,031,891 | B2* | 7/2018 | Kumar ................ G06F 16/9574 |
| 10,114,902 | B2 | 10/2018 | Byakod et al. |
| 10,169,188 | B2 | 1/2019 | Belekar et al. |
| 10,534,512 | B2 | 1/2020 | Jadhav et al. |
| 10,706,122 | B2 | 7/2020 | Sabbavarpu |
| 10,831,831 | B2 | 11/2020 | Greene |
| 10,860,594 | B2 | 12/2020 | Jamshidi |
| 10,963,470 | B2 | 3/2021 | Jamshidi |
| 10,970,294 | B2 | 4/2021 | Jamshidi |
| 11,113,276 | B2 | 9/2021 | Zhao |
| 11,262,979 | B2 | 3/2022 | Desmukh et al. |
| 2004/0039734 | A1 | 2/2004 | Judd et al. |
| 2006/0253345 | A1 | 11/2006 | Herber |
| 2008/0133500 | A1 | 6/2008 | Edwards |
| 2009/0113287 | A1 | 4/2009 | Yee |
| 2010/0042608 | A1 | 2/2010 | Kane |
| 2012/0010927 | A1 | 1/2012 | Attenberg et al. |
| 2012/0017281 | A1 | 1/2012 | Bannerjee et al. |
| 2012/0047120 | A1 | 2/2012 | Connolly |
| 2012/0254405 | A1 | 10/2012 | Ganesh et al. |
| 2012/0254723 | A1 | 10/2012 | Kasa et al. |
| 2013/0282691 | A1 | 10/2013 | Stouffer et al. |
| 2014/0164345 | A1 | 6/2014 | Connolly et al. |
| 2014/0304578 | A1 | 10/2014 | Parkinson et al. |
| 2015/0039746 | A1 | 2/2015 | Mukherjee et al. |
| 2015/0161135 | A1* | 6/2015 | Ciccolo ............. G06F 16/24578 |
| | | | 707/723 |
| 2015/0242527 | A1* | 8/2015 | Cai ....................... G06F 40/143 |
| | | | 715/234 |
| 2015/0317132 | A1 | 11/2015 | Rempell et al. |
| 2015/0348071 | A1 | 12/2015 | Cochrane et al. |
| 2016/0055490 | A1 | 2/2016 | Keren et al. |
| 2016/0210360 | A9 | 7/2016 | Stouffer et al. |
| 2016/0353148 | A1 | 12/2016 | Prins et al. |
| 2017/0116349 | A1* | 4/2017 | Steiner ................ G06F 16/9566 |
| 2018/0210965 | A1 | 7/2018 | Grigoryan et al. |
| 2019/0073365 | A1 | 3/2019 | Jamshidi |
| 2019/0325485 | A1* | 10/2019 | Tully .................... G06F 16/337 |
| 2019/0340225 | A1* | 11/2019 | Hamon ................ G06F 40/146 |
| 2020/0151187 | A1 | 5/2020 | Jamshidi |
| 2020/0394200 | A1 | 12/2020 | Jamshidi |
| 2021/0326348 | A1 | 10/2021 | Jamshidi |

OTHER PUBLICATIONS

U.S. Appl. No. 63/279,063, Jacobsen et al.
Gustafsdottir [online], "CMS Plugin: Frequently Asked Questions," Siteimprove.com, Jul. 9, 2020, 3 pages.
Gustafsdottir [online], "How to navigate the Siteimprove CMS Plugin," Siteimprove.com, Sep. 10, 2020, 7 pages.
Kamal, "Evaluating web accessibility metrics for Jordanian Universities," International Journal of Advanced Computer Science and Applications, 2016, 7(7):113-122.
Needham [online], "CMS Plugin: Security FAQ," Siteimprove.com, Aug. 9, 2020, 2 pages.
Needham [online], "On which CMS is the Siteimprove plugin available?," Siteimprove.com, May 7, 2020, 11 pages.
Sergio Pedercini [online], "How to code a responsive circular percentage chart with SVG and CSS", retrieved from URL: https://nnediunn.conn/@pppped/how-to-code-a-responsive-circular-percentage-chart-with-svg-and-css-3632f8cd7705, May 17, 2017, 5 pages.
Silktide.com [online], "Silktide," available on or before Feb. 8, 2017, via Internet Archive: Wayback Machine URL <https://web.archive.org/web/20170208112649/https://silktide.com/>, retrieved on May 7, 2020, URL<http://www.silktide.comt>, 2 pages.
Sitebeam.net [online], "Sitebeam," available on or before Feb. 4, 2017, via Internet Archive: Wayback Machine URL <https://web.archive.org/web/20170204162753/http://sitebeam.net/>, retrieved on May 7, 2020, URL<http://www.sitebeam.net>, 4 pages.
Siteimprove.com [online], "Adobe Experience Manager: Siteimprove provided plugin," available on or before Aug. 12, 2020, via Internet Archive: Wayback Machine URL<https://web.archive.org/web/20200812065134/https:/siteimprove.com/en/core-platform/integrations/cms-plugin/adobe-experience-manager/>, retrieved on Mar. 21, 2022, URL<https://siteimprove.com/en/core-platform/integrations/cms-plugin/adobe-experience-manager/>, 18 pages.
Siteimprove.com [online], "Adobe Experience Manager: Siteimprove provided plugin," available on or before Sep. 20, 2020, via Internet Archive: Wayback Machine URL<https://web.archive.org/web/20200920011517/https:/siteimprove.com/en/core-platform/integrations/cms-plugin/adobe-experience-manager//>, retrieved on Mar. 21, 2022, URL<https://siteimprove.com/en/core-platform/integrations/cms-plugin/adobe-experience-manager/>, 18 pages.
Siteimprove.com [online], "Aug. & Sep. 2021 Release Highlights," Oct. 8, 2021, retrieved on Mar. 21, 2022, retrieved from URL<https://help.siteimprove.com/support/solutions/articles/80000946947-august-september-2021-release-highlights>, 2 pages.
Siteimprove.com [online], "Drupal," available on or before Aug. 12, 2020, via Internet Archive: Wayback Machine URL<https://web.archive.org/web/20200812071254/https:/siteimprove.com/en/core-platform/integrations/cms-plugin/drupal/>, retrieved on Mar. 21, 2022, URL<https://siteimprove.com/en/core-platform/integrations/cms-plugin/drupal/>, 12 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866#h_01F0GCPTWX5H3ZS558VIGVEQQN>, 3 pages.
Siteimprove.com [online], "Feb. 2021 Release Highlights," Sep. 23, 2021, retrieved on Mar. 21, 2022, retrieved from URL<https://help.siteimprove.com/support/solutions/articles/80000863866-february-2021-release-highlights>, 3 pages.
Siteimprove.com [online], "Jan. 2021 Release Highlights," Oct. 1, 2021, retrieved on Mar. 21, 2022, retrieved from URL<https://help.siteimprove.com/support/solutions/articles/80000863867-january-2021-release-highlights>, 3 pages.
Siteimprove.com [online], "Jul. 2021 Release Highlights," Sep. 23, 2021, retrieved on Mar. 21, 2022, retrieved from URL<https://help.siteimprove.com/support/solutions/articles/80000863850-july-2021-release-highlights>, 4 pages.
Siteimprove.com [online], "Oct. & Nov. 2021 Release Highlights," Dec. 7, 2021, retrieved on Mar. 21, 2022, retrieved from URL<https://help.siteimprove.com/support/solutions/articles/80000958280-october-november-2021-release-highlights>, 3 pages.
Siteimprove.com [online], "Oct. 2020 Release Highlights," Nov. 16, 2021, retrieved on Mar. 21, 2022, retrieved from URL<https://help.siteimprove.com/support/solutions/articles/80000448376-october-2020-release-highlights>, 2 pages.
Siteimprove.com [online], "Optimizely + Siteimprove," available on or before Jun. 16, 2021, via Internet Archive: Wayback Machine URL<https://web.archive.org/web/20210616140532/https:/siteimprove.com/en/core-platform/integrations/cms-plugin/optimizely/>, retrieved on Mar. 21, 2022, URL<https://siteimprove.com/en/core-platform/integrations/cms-plugin/optimizely//>, 12 pages.
Siteimprove.com [online], "Siteimprove CMS Plugin Integration Cookbook," available on or before Aug. 5, 2020, via Internet Archive: Wayback Machine URL<https://web.archive.org/web/20200805195514/https:/developer.siteimprove.com/cms-plugin-integration-cookbook/>, retrieved on Mar. 21, 2022, URL<https://developer.siteimprove.com/cms-plugin-integration-cookbook/>, 13 pages.
Siteimprove.com [online], "Web accessibility for all with the next generation of Siteimprove Accessibility," Mar. 20, 2020, retrieved on Mar. 21, 2022, retrieved from URL<https://siteimprove.com/en-us/blog/web-accessibility-for-all-with-next-generation-siteimprove-accessibility/>, 36 pages.

(56) References Cited

OTHER PUBLICATIONS

Wikipedia.com [online], "URI normalization," Oct. 20, 2020, retrieved on Mar. 21, 2022, retrieved from URL<https://en.wikipedia.org/w/index.php?title=URI_normalization&oldid=984473278>, 2 pages.

Zhou, "Evaluating Websites Using a Practical Quality Model", Software Technology Research Laboratory, De Montfort University, 2009, 113 pages.

* cited by examiner

```
{
    childNodesList: [ { index: 15 } ],
    element: { localNameRef: 1, attributesList: [ localNameRef: 15, valueRef: 19 ] }
},
{
    childNodesList: [ ],
    text: { dataRef: 20 }
},
{
    childNodesList: [ { index: 17 } ],
    element: { localNameRef: 1, attributesList: [ localNameRef: 15, valueRef: 19 ] }
},
{
    childNodesList: [ ],
    text: { dataRef: 21 }
},
{
    childNodesList: [ { index: 19 } ],
    element: { localNameRef: 10, attributesList: [ { localNameRef: 8, valueRef: 22 } ] }
},
{
    childNodesList: [ ],
    text: { dataRef: 23 }
},
...
{
    childNodesList: [ { index: 22 } ],
    element: { localNameRef: 25, attributesList: [ ] }
},
{
    childNodesList: [ ],
    text: { dataRef: 26 }
},
...
],
stringsList:
[
    0 : "font-weight: bold", 1 : "div", ... 6 : "body", ... 8 : "id", 9 : "styleA", 10 : "style",
    2 : "div{ font-weight: bold }", ... 13 : "List Title", 14 : "host", 15 : "role",
    16 : "list", 17 : "font-weight: normal", 18 : "open", 19 : "listitem",
    20 : "List item 1", 21 : "List item 2", 22 : "styleB", 23 : "div{ font-weight: normal }", ...
    25 : "script", 26 : "const host = document.querySelector('#host');\n const root = host.attachShadow({ mode: 'open' });\n ..."
]
}
```

Index: 14 — 220
Index: 15 — 222
Index: 16 — 224
Index: 17 — 226
Index: 18 — 228
Index: 19 — 230
Index: 21 — 232
Index: 22 — 234

CLIENT-SIDE GENERATION OF LOSSLESS OBJECT MODEL REPRESENTATIONS OF DYNAMIC WEBPAGES

TECHNICAL FIELD

This document describes devices, systems, and methods related to generating lossless representations of object models of webpages, such as dynamic webpages having scripts that dynamically modify webpage elements.

BACKGROUND

Webpages that are requested and presented in web browsers can identify and incorporate a variety of different files and information to render the webpage. For example, a webpage can include an HTML, which can reference various scripts, style sheets (e.g., cascading style sheets ("CSS")), images, videos, and/or other content that are retrieved and rendered as part of the website. Some content in a webpage can be static—meaning it does not change on the website—while other content on a webpage can be dynamic, which means that the content can be modified on the webpage. Some dynamic content modifications may be based on user input, such as a user selecting an option to change the layout of the website, while other dynamic content modifications may be performed automatically, such as based on a script loading and automatically modifying elements of the website.

Web browsers can use a variety of data structures to represent, manage, and present a webpage in a display. One of these data structures is a document object model ("DOM"), which stores the elements of the webpage, their attributes, and relationship to each other. The DOM can be organized in a tree structure, with nodes representing elements, such as HTML tags, and vertices representing relationships between the elements, such as one HTML tab being nested within another tag. The DOM can be dynamically modified by scripts that are loaded as part of the page, such as JavaScript files that are included and loaded with the webpage by the browser. Another data structure used by a web browser is a CSS object model ("CSSOM"), which can represent styles that have been loaded/created as part of the webpage, and that are used to style elements in the DOM. There can be mappings between the DOM and the CSSOM that are used by the browser to render the webpage.

SUMMARY

The document generally relates to technology for generating an accurate and lossless representation of an object model of a webpage, such as a dynamic webpage, as it is rendered by a web browser on a client computing device. For example, accurate representations of a webpage can be challenging, particularly when taking into account different styles that are applied to different portions of the webpage. Simply performing static analysis of a webpage, including its HTML, scripts, CSS, and other files, may fail to fully present the elements of a webpage as they will be represented in the DOM and CSSOM, and rendered in the browser, especially when the analysis of the webpage is performed at a remote server system. Dynamically rendering a webpage in the web browser can provide a more accurate representation of the webpage, but it can be challenging to accurately export a static representation of the rendered webpage from the browser on the client computing device and to the server system because the elements of the webpage are spread across the DOM, CSSOM, and other data structures, which may further be subject to modification based on dynamic scripts that are further modifying those data structures as part of the page. As a result, checking content of the dynamic webpage at the remote server system or by one or more services can be a slow process and less computationally efficient. The disclosed technology therefore provides for accurate client-side generation of a lossless static object model of the dynamic webpage as rendered by the web browser in a manner that incorporates all of the different browser data sources into a cohesive and combined object model, including portions of the webpage that are intentionally separated from other portions of the webpage. The disclosed technology can therefore be used to directly ingest a DOM that is dynamically generated by the web browser when the webpage is rendered on the client computing device so that contents of the DOM are captured and transferred to the remote server system, without having to transfer the entire DOM. The remote server system can then ingest the directly ingested DOM from the client computing device and into a content check pipeline such that rendering of the dynamic webpage may not be performed by a crawler of the remote server system.

The disclosed technology additionally provides for lossless representation of rendered webpages—meaning that the static object model of the webpage can be used to reproduce the complete webpage as rendered in the browser at the client computing device without loss of any content, styles, or information. The models that are generated for websites can be used in a variety of ways, such as permitting for a variety of different webpage analysis (e.g., accessibility assessment, search engine optimization ("SEO"), online advertising assessment) to be performed on the webpage without having to separately render the webpage for each analysis at the server system. Additionally, the models that are generated for webpages can be used to succinctly store the content of rendered webpages, which can permit for ready tracking changes and modifications to the webpage over time.

Although the disclosed inventive concepts include those defined in the attached claims, it should be understood that the inventive concepts can also be defined in accordance with the following embodiments.

Embodiment 1 is a method for generating a lossless representation of a webpage on a client device, the method comprising: rendering, by a client device, a webpage to be presented in a web browser at the client device; receiving, by the client device, an indication of user input to run a content check on the rendered webpage; calling, by the client device and in response to receiving the indication of user input, a scraping function to scrape a document object model ("DOM") of the rendered webpage in the web browser at the client device; generating, by the client device, a lossless representation of the scraped DOM of the rendered webpage; and transmitting, by the client device and to a web content analysis system, the lossless representation of the scraped DOM to be used when running the content check for the rendered webpage.

Embodiment 2 is the method of embodiment 1, wherein the rendered webpage is a preview of the webpage.

Embodiment 3 is the method of any one of embodiments 1 through 2, wherein the indication of user input includes a reference pointer to a portion of the webpage DOM for which to run the content check.

Embodiment 4 is the method of any one of embodiments 1 through 3, wherein the reference is at least one of a link to a preview of the rendered webpage and a DOM root node.

Embodiment 5 is the method of any one of embodiments 1 through 4, further comprising: calling, by the client device and based on the reference pointer, the scraping function to scrape the portion of the webpage DOM that corresponds to the reference pointer; and responsively generating, by the client device, a lossless representation of the scraped portion of the DOM.

Embodiment 6 is the method of any one of embodiments 1 through 5, further comprising: receiving, by the client device and from a computer system, a script including code for scraping a DOM of a webpage at a client device; exposing, by the client device, the code as the scraping function; and responsively calling, by the client device, the scraping function to scrape the DOM of the rendered webpage in the web browser at the client device.

Embodiment 7 is the method of any one of embodiments 1 through 6, wherein the lossless representation of the scraped DOM is a flat object model ("FlatOM") of the DOM of the rendered webpage.

Embodiment 8 is the method of any one of embodiments 1 through 7, wherein the lossless representation of the scraped DOM is ingested directly into a content check pipeline of the web content analysis system.

Embodiment 9 is the method of any one of embodiments 1 through 8, wherein ingesting the lossless representation of the scraped DOM directly into the content check pipeline comprises bypassing internal rendering of the DOM at the web content analysis system.

Embodiment 10 is the method of any one of embodiments 1 through 9, wherein the content check is a pre-publish check of the rendered webpage before the rendered webpage is published and presented in web browsers of user devices.

Embodiment 11 is the method of any one of embodiments 1 through 10, further comprising: scraping, by the client device and based on calling the scraping function, a cascading style sheet object model ("CSSOM") of the rendered webpage in the web browser at the client device; and responsively generating, by the client device, a lossless representation of the scraped DOM and the scraped CSSOM of the rendered webpage.

Embodiment 12 is the method of any one of embodiments 1 through 11, further comprising: receiving, by the client device and from the web content analysis system, results from running the content check for the rendered webpage using the lossless representation of the scraped DOM; and outputting, by the client device, the results in a plugin to be presented with the rendered webpage in the web browser at the client device.

Embodiment 13 is the method of any one of embodiments 1 through 12, wherein the webpage is rendered in a content management service ("CMS") interface presented in the web browser at the client device.

Embodiment 14, is the method of any one of embodiments 1 through 13, wherein a CMS plugin is presented with the rendered webpage in the CMS interface, the CMS plugin including results from the web content analysis system running the content check on the rendered webpage.

Embodiment 15 is the method of any one of embodiments 1 through 14, wherein the rendered webpage is an editable version of the webpage.

Embodiment 16 is a system for generating a lossless representation of a webpage on a client device, the system comprising: a client device configured to render webpage content in a web browser at the client device; and a web content analysis system in communication with the client device and configured to: run at least one content check based on analyzing content of the webpage that is rendered at the client device; and generate a plugin for deployment at the client device, wherein the plugin is configured to provide integration between the client device and the web content analysis system, wherein the client device is configured to perform operations comprising: rendering the webpage to be presented in the web browser at the client device with the plugin; receiving an indication of user input to run a content check on the rendered webpage; calling, in response to receiving the indication of user input, a scraping function to scrape a DOM of the rendered webpage in the web browser at the client device, wherein the scraping function is provided by the web content analysis system via the plugin; generating a lossless representation of the scraped DOM of the rendered webpage; and transmitting, to the web content analysis system, the lossless representation of the scraped DOM to be used in running the at least one content check for the rendered webpage.

Embodiment 17 is the system of embodiment 16, wherein the client device performs operations further comprising: receiving, from a computer system, a script including code for scraping a DOM of a webpage at a client device; exposing the code as the scraping function; and responsively calling the scraping function to scrape the DOM of the rendered webpage in the web browser at the client device.

Embodiment 18 is the system of any one of embodiments 16 through 17, wherein the at least one content check is a pre-publish check of the rendered webpage before the rendered webpage is published and presented in web browsers of user devices.

Embodiment 19 is the system of any one of embodiments 16 through 18, wherein the client device performs operations further comprising: receiving, from the web content analysis system, results from running the at least one content check for the rendered webpage using the lossless representation of the scraped DOM; and outputting the results in the plugin to be presented with the rendered webpage in the web browser at the client device.

Embodiment 20 is the system of any one of embodiments 16 through 19, wherein: the webpage is rendered in a content management service ("CMS") interface presented in the web browser at the client device, and the plugin is presented with the rendered webpage in the CMS interface, the plugin including results from the web content analysis system running the at least one content check on the rendered webpage.

The devices, system, and techniques described herein may provide one or more of the following advantages. For example, the disclosed technology provides for computationally efficient performance of a content check pipeline using a lossless representation of the webpage's DOM when the lossless representation is generated at the client computing device. The content check pipeline can be part of the remote server system. By directing the process of generating the lossless representation of the webpage's DOM at the client computing device, compute resources and processing power of the remote server system can be allocated for execution of the content check pipeline, thereby making the pipeline more efficient. A more efficient pipeline can result in accurate content check results being provided in less time to a relevant user associated with the webpage. In some implementations, for example, processing per content check can take between 1 to 30 seconds using the disclosed technology. The relevant user can then address potential issues identified by the content check results to quickly and efficiently prepare their webpage for publication and release to the end users.

The disclosed technology also provides for removing time-consuming tasks performed by the crawler of the remote server system such that compute resources and processing power of the remote server system can be allocated to other tasks, such as executing the content check pipeline and performing other web content analysis services described throughout this disclosure. Tasks performed by the crawler can therefore be shifted to the client computing device.

As another example, the disclosed technology can permit for accurate and lossless static object models of webpages to be generated, which can improve the accuracy of webpage analysis features (e.g., accessibility analysis systems, SEO analysis systems, ads performance systems, webpage quality assessment systems). Similarly, rendering and analyzing the webpage at the client computing device can eliminate additional steps of packaging and unpacking the webpage for ingestion and analysis by the remote server system, thereby increasing efficiency and use of compute resources and processing power for other services to be performed by the remote server system, such as analyzing content of the webpage before the webpage is published. Furthermore, shifting ingestion of the webpage to the client computing device can result in more computationally efficient and compact transmission of data between the client computing device, the remote server system, and one or more other services and/or systems in the content check pipeline or other pipelines that may analyze and/or process the webpage content.

Additionally, the lossless representations of object models that are generated with the disclosed technology can provide the computational efficiencies of static webpage analysis, which can be performed without the computation resources required to render and analyze a rendered webpage, while providing significant improvements in accuracy of the analysis that is being performed. For example, with static analysis there can be significant gaps and/or omissions in the analysis since the dynamically rendered content of the webpage may deviate and differ significantly from the static content as represented in the static webpage files (e.g., HTML files, scripts, CSS). The disclosed technology can therefore permit for the webpage as rendered to be accurately represented and analyzed without having to render the webpage. Such a structure can permit for a webpage to be rendered a single time, the object model to be generated, and then for the object model to simply be shared across multiple different webpage analysis pipelines without having to be re-rendered for each pipeline—thereby creating increased efficiency and decreasing the computation resources required across the pipelines.

Furthermore, the disclosed technology captures webpage content directly in a browser of a client device, which does not require direct external access to the content. Moreover, because direct external access is not required, the disclosed technology does not require use or access to user credentials (which preserves user privacy and security) nor does the disclosed technology require the webpage to be accessible over the Internet or other networks.

Similarly, because a script used for scraping and capturing webpage content runs entirely in the context of a CMS system's domain, the disclosed technology can avoid potential security concerns or breaches. The disclosed technology can be performed securely since responsibility is put on a CMS integrator or partner to ensure that a preview of a not-yet-published webpage is rendered within an iFrame that the CMS integrator or partner has access to (e.g., being on the same domain).

The details of one or more implementations are set forth in the accompanying drawings and the description below. Other features and advantages will be apparent from the description and drawings, and from the claims.

BRIEF DESCRIPTION OF THE DRAWINGS

FIG. 2B-C depicts an example object model generating using node and string references.

Like reference symbols in the various drawings indicate like elements.

DETAILED DESCRIPTION OF ILLUSTRATIVE EMBODIMENTS

This document generally describes technology for generating an accurate and lossless static object model ("OM") of a dynamic webpage that is rendered by a web browser at a client computing device. The disclosed technology can be used to generate the lossless static OM at the client computing device and transmit that OM to a server system for further processing. Sometimes, generating the lossless static OM at the server system can result in loss of some elements of the rendered webpage. Generating the lossless static OM at the client computing device, on the other hand, can save computation resources since the lossless representation of a DOM of a rendered webpage can simply be transmitted to the server system and then ingested into one or more webpage content analysis pipelines without having to first crawl the DOM of the rendered webpage at the server system. As a result, the disclosed technology provides users with the ability to run fast, reliable, and efficient content checks and/or pre-publish content checks on content in their webpage before releasing the webpage content to end users. The disclosed technology provides a pipeline that does not require a crawler of the server system to first render html of the webpage before being able to generate the lossless static OM and perform content checks and/or the pre-publish content checks.

Figure 1:
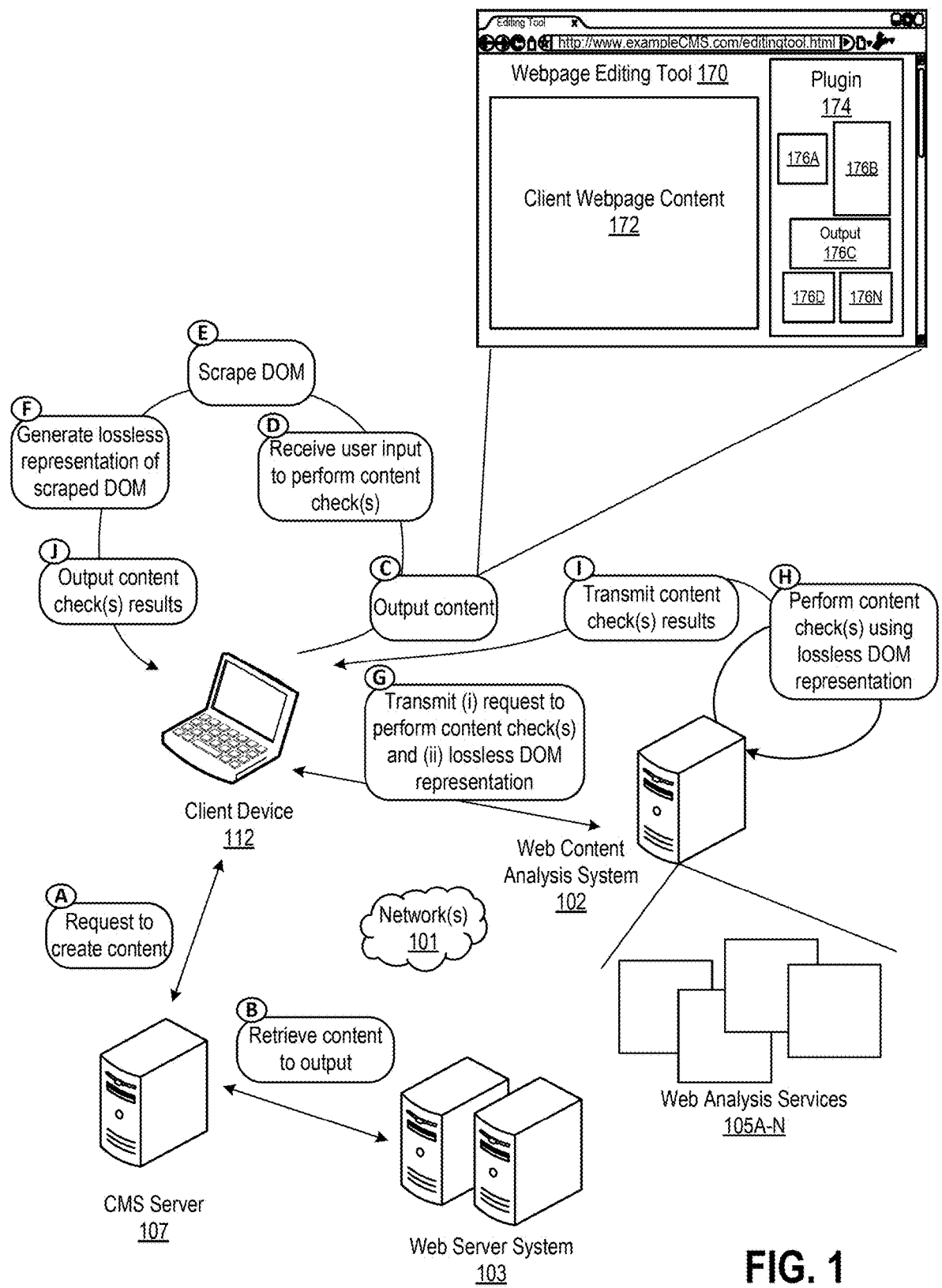
FIG. 1 is a conceptual diagram for generating a lossless representation of a webpage DOM at a client computing device.

Referring to the figures, FIG. 1 is a conceptual diagram for generating a lossless representation of a webpage DOM at a client computing device 112 (e.g., client device 112). A web content analysis system 102, a client device 112, a content management system (CMS) server 107, and a web server system 103 can be in communication (e.g., wired and/or wireless) via network(s) 101. Although shown as separate components and systems, in some implementations, one or more of 102, 112, 107, and/or 103 can be combined into a computing system or otherwise part of a network of computing devices, systems, and/or cloud-based services. In some implementations, the CMS server 107 can be part of the web content analysis system 102.

The web content analysis system 102 can be a computer, computing system, computing device, network of devices, cloud-based system, and/or cloud-based server that can provide website analytics to website owners (e.g., clients), website operators, and other relevant users. For example, the system 102 can assess quality of websites and, more particularly, webpages for website owners or other relevant users and provide suggestions for improving those websites or webpages based on particular client needs. The system 102 can also be configured to generate a CMS plugin 174, which can be presented in a webpage editing tool 170 at the client device 112. The system 102 can populate the CMS plugin 174 with information about the quality of the website owner's webpage.

The web content analysis system 102 can include web analysis services 105A-N, which can be configured to assess different aspects of the webpage. The web analysis services 105A-N can perform any of the pre-publication webpage content checks described herein. For example, one or more of the services 105A-N can be configured to identify misspellings, noncompliance with accessibility standards, policy violations, SEO issues, ads issues, and other potential errors in the webpage that may impact the webpage's quality. In some implementations, one or more of the services 105A-N can be provided by one or more different third parties and/or computing systems.

The client device 112 can be a user device, including but not limited to a mobile phone, smartphone, laptop, tablet, computer, or other type of user device. The client device 112 can be used by the website owner (e.g., client) or other relevant user who operates the website and/or improves, changes, or modifies the website. The website owner can access content management services via a CMS interface, such as the webpage editing tool 170, which can be provided by the CMS server 107. The webpage editing tool 170 can be used to generate, create, modify, and/or maintain content in webpages of the website owner. The webpage editing tool 170 can also be used to view and learn insights about the webpages of the website owner, such as quality of a webpage, how much traffic the webpage is getting, keyword suggestions, search engine optimization (SEO) suggestions, advertisement recommendations, and/or search engine rankings. One or more other content management services can be provided by the CMS server 107 and presented in one or more CMS interfaces at the client device 112, such as the webpage editing tool 170.

The CMS server 107 can provide content management services to the website owner at the client device 112, as described above.

The web server system 103 can host code for webpages of websites. The code can be retrieved by any of the systems described herein to render a webpage at the client device 112.

The webpage editing tool 170 can display both client webpage content 172 and the CMS plugin 174 at the client device 112. The client webpage content 172 can be presented within an iFrame that displays a rendered version of a particular webpage of the website owner's website. The webpage content 172 can be rendered as if it were presented at a user device of an end user. Therefore, the website owner can assess the webpage content 172 as it would appear to an end user. The website owner can also edit any of the webpage content 172 directly in the website editing tool 170. For example, the webpage editing tool 170 can present multiple options, such as buttons, that can be selected by the website owner to edit the webpage content 172 and perform other content creation and/or analytics actions. These edits can appear in the webpage content 172, which the website owner can save and run a pre-publication check on. As described herein, when the website owner selects the option to run the pre-publication check, the client webpage content 172 can be scraped and ingested at the client device 112 to generate a lossless representation of the webpage's DOM. The lossless representation of the DOM can then be transmitted to the web content analysis system 102 and directly used in executing the pre-publication check. Moreover, the CMS plugin 174 can be presented in another iFrame separate from the iFrame of the webpage content 172 in the webpage editing tool 170. The plugin 174 can present information about the client webpage content 172, such as results from quality assessments that were performed during the pre-publication check by the web analysis services 105A-N at the web content analysis system 102.

As mentioned above, after the website owner or other relevant user edits the webpage content 172 (or simply views the webpage content 172), the website owner can select an option (e.g., button) in the webpage editing tool 170 to run the pre-publication check on the webpage content 172. When the option is selected, the CMS server 107 can provide a unique identifier (ID) and session ID that identifies the website owner and the webpage to the web content analysis system 102. The system 102 can use the unique ID and/or session ID to poll for relevant information related to the webpage content 172 and run the pre-publication check on the webpage content 172. The webpage content 172 can be scraped, ingested, and packaged at the client device 112 using the techniques described herein, before being transmitted to the web content analysis system 102 and being ingested by the web analysis services 105A-N along with the unique ID and/or session ID. The system 102 can then return the results from assessments performed by the web analysis services 105A-N, which can be presented in one or more output blocks 176A-N of the plugin 174.

The plugin 174 includes one or more output blocks 176A-N. The output blocks 176A-N can be similar to placeholders. Each web analysis service 105A-N that is run to assess the webpage content 172 can generate results that are presented in the output blocks 176A-N. Each service 105A-N can be assigned one or more of the output blocks 176A-N. In some implementations, the plugin 174 can be a panel that is presented concurrently with the webpage content 172 (e.g., once an option, such as a button in the webpage editing tool 170, is selected to view the plugin 174). In some implementations, the plugin 174 may also be presented in the webpage editing tool 170 as overlapping at least a portion of the client webpage content 172. The plugin 174 is described further in reference to U.S. application Ser. No. 17/672,222, entitled WEB SITE PLUGIN AND FRAMEWORK FOR CONTENT MANAGEMENT SERVICES, filed on Feb. 15, 2022, the disclosure of which is incorporated by reference in its entirety.

Still referring to FIG. 1, the client device 112 can request to create content from the CMS server 107 (block A). For example, the website owner or another relevant user can request to load a particular webpage as the webpage content 172 in the webpage editing tool 170. This webpage can be one that the website owner desires to edit, create, and then publish. The client device 112 can provide the CMS server 107 with a client ID and a webpage ID, which can be used to retrieve corresponding webpage code from the web server system 103. When the client device 112 request to create content from the CMS server 107, the client device 112 may include a message request for the CMS server 107 to also get the CMS plugin 174, from the web content analysis system 102, for the particular client ID. Thus, the client device 112 can present the rendered webpage content 172 concurrently with the CMS plugin 174 in the webpage editing tool 170.

The CMS server 107 can retrieve content from the web server system 103 (block B). The content can include webpage code, including but not limited to HTML, CSS, Jayscript, images, and any other files, including but not limited to OMs for the particular webpage, that may be used to render the webpage.

The content can be transmitted from the web server system 103 back to the CMS server 107 or directly to the client device 112 to be presented/outputted in the website editing tool 170 as the webpage content 172 (block C). Once the webpage content 172 is displayed to the website owner, the website owner can edit the content 172 and/or create new content therein. In some implementations, the webpage content 172 can be rendered at the client device 112. In some implementations, the webpage content 172 can be rendered and previewed in the webpage editing tool 170 at the client device 112.

The website owner may desire to publish the webpage content 172, whether it is simply rendered at the client device 112 or rendered and previewed at the client device 112. As described above, the website owner may select an option in the webpage editing tool 170, or directly in the CMS plugin 174, to perform a pre-publication content check on the webpage content 172. When the website owner selects that option, the client device 112 can receive user input indicating selection of the option to perform one or more content checks on the webpage content 172 (block D).

Accordingly, the client device 112 can execute scraping code to scrape (e.g., traverse, ingest) a DOM and/or other OMs of the webpage content 172 (block E). The client device 112 can scrape an entire DOM or other OMs of the webpage content 172. In some implementations, the user input received in block D can include a pointer, link, or other identifier/reference to a particular portion of the DOM or other OMs to scrape. The client device 112 can then scrape only the portion of the DOM or other OMs that is associated with the pointer. As an illustrative example, if content is rendered within a CMS's own DOM, such as if the CMS is headless, rather than being isolated (e.g., in an iFrame), a root node can be provided to the client device 112 from which capturing of the content can then be performed. Sometimes, the user can provide a link to particular content components that the client device 112 should scrape, rather than an entire OM associated with the link.

As described further below, scraping techniques can be performed at the client device 112 instead of another computer system (such as the web content analysis system 102) to generate a lossless representation of the webpage's OMs. The lossless representation can be a flattened DOM, which can be small in size and efficient to transmit over the network(s) 101 without loosing detail, content, or accuracy of the webpage's OMs.

By scraping the DOM of the webpage rendered at the client device 112, the client device 112 can then generate the lossless representation of the scraped DOM (block F). The lossless representation of the scraped DOM can be a static OM or other flat OM.

The client device 112 can transmit (i) a request to perform the content check(s) for the webpage content 172 and (ii) the lossless representation of the DOM to the web content analysis system 102 (block G). The DOM can be serialized to JSON (e.g., string representation) before the DOM is passed to scraping code/script running within the plugin's iFrame at the client device 112 (and thus within security bounds of the web content analysis system 102). Information transmitted to the web content analysis system 102 can be the serialized DOM itself, dimensions of a viewport at which the content was captured from, and/or a time (e.g., timestamp, duration of time) that it took to capture the content.

In some implementations, the request can include the client ID, which can be used by the web content analysis system 102 to identify the website owner's preferences and/or service subscriptions and determine which of the web analysis services 105A-N to execute as part of the content check(s). The content check(s) can include pre-publication content checks, in which the webpage content 172 has not yet been published. In some implementations, the content check(s) can be performed on webpage content that has been published and/or webpage content that has been published and edited/modified in the webpage editing tool 170 (and thus would be published again).

Since the system 102 receives the lossless representation of the webpage DOM (block G), the webpage DOM does not need to be scraped at the system-side. Instead, the lossless representation of the webpage DOM can be simply and efficiently ingested into a content check pipeline. For example, the lossless representation of the DOM can be directly ingested by one or more of the web analysis services 105A-N. Accordingly, the web analysis services 105A-N can be run at the web content analysis system 102 to perform the content check(s) using the lossless representation of the DOM (block H).

Each of the services 105A-N can transmit results from their respective content checks back to the client device 112 (block I). In some implementations, the results from the services 105A-N can be compiled at the web content analysis system 102 and then transmitted to the client device 112 to be presented in the CMS plugin 174 in the webpage editing tool 170 (block J). As the results are generated, they can be presented in the plugin 174 in real-time or near real-time. The plugin 174 can utilize a framework that allows each service 105A-N, which is designated one or more particular output blocks 176A-N, to consistently rank, format, and display their results in the same portions of the plugin 174. Using the results from the content check(s), the website owner can update the webpage content 172 and publish it or just publish the webpage content 172 as it is rendered or rendered and previewed at the client device 112.

Figure 2A:
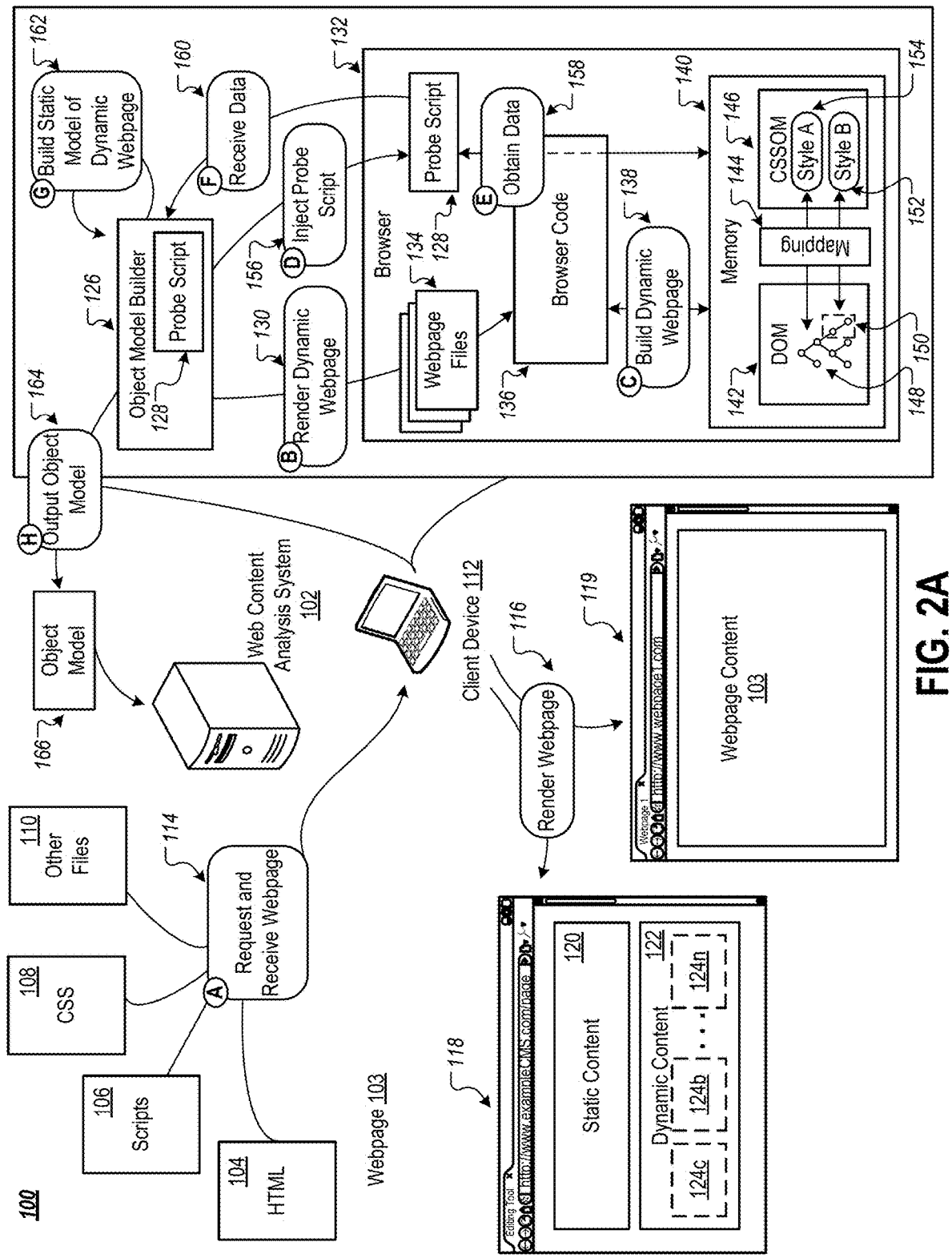
FIG. 2A is a conceptual diagram for generating a lossless representation of a webpage DOM at a client computing device.

FIG. 2A is a conceptual diagram for generating a lossless representation of a webpage DOM at a client computing device, such as the client device 112. An example system 100 includes the client device 112, which can request and receive a webpage 103 (114), which can include multiple different components, such as HTML 104, scripts 106 (e.g., JavaScript), CSS files 108, and/or other files 110 (e.g., images, content files, videos). The client device 112 can use a browser application 118 and/or 119 to render the webpage 103 using the files 104-110 (116). In the example browser 118 that is depicted, the rendered webpage 103 includes static content 120 and dynamic content 122. The static content 120 can be content that does not change as part of the webpage 103, such as an HTML tag in the HTML 104 that is not modified by a script 106. The dynamic content 122 can be content that is modified in some way (e.g., added, removed, changed) during loading, presentation, and/or use in the browser 118, such as elements that are modified based on user input. The dynamic content 122 may include various states 124a-n that may be entered into by the browser 118 while the webpage 103 is being presented. The browser 118 can therefore include a CMS interface (e.g., the CMS plugin 174 described in reference to FIG. 1) and/or CMS code intertwined with the webpage 103, which can allow the user of the client device 112 to edit and/or modify content in the webpage 103 as it is presented in the browser 118. In the example browser 119 that is depicted, the webpage 103 may simply be rendered without the CMS interface and/or the CMS code. When scraping the webpage 103 using the techniques described herein, the user can provide a link from the CMS interface presented in the browser 118 that directs the client device 112 to scrape a particular portion of a DOM and/or other OMs of the webpage 103. When the webpage 103 is scraped from the browser 119, on the other hand, the entire DOM and/or other OMs of the webpage 103 may be scraped since no CMS interface is presented in the browser 119 that would provide the user with an option to identify a portion of the DOM to be scraped. In some implementations, the entire DOM may also be scraped when the webpage 103 is presented in the browser 118.

The client device 112 can receive scraping code from the web content analysis system 102 so that the client device 112 can scrape the webpage 103. The scraping code can be received before the webpage 103 is rendered (116) in either browser 118 or 119. In some implementations, the scraping code can be received once the webpage 103 is rendered (116).

The scraping code can be used to configure an object model builder 126 at the client device 112, which can build a static OM of the webpage 103 as it is rendered in the browser 118 or 119 at the client device 112. The object model builder 128 accomplishes this through the use of a browser 132, which can be the same as the browser 118 and/or 119. The object model builder 126 can run the browser 132 and direct it to render the webpage 103, as indicated by block B (130). As part of this, the browser 132 can receive webpage files 134 from the object model builder 126, and browser code 136 can build the dynamic webpage 103 in the browser's memory 140, as indicated by block C (138). Rendering the webpage 103 can include building a DOM 142, a CSSOM 146, and a mapping 144 there between for the webpage 103. As shown in the example that is depicted, the DOM 142 can include a regular portion 148 of the DOM as well as a shadow DOM 150, which is attached to an element of the regular portion 148 of the DOM 142, but which has a different style B 152 in the CSSOM 146 from the style A 154 that is mapped to the regular portion 148 of the DOM 142.

The object model builder 126 can inject a probe script 128 (e.g., JavaScript) into the browser 132 to query and retrieve data from memory 140 in order to build the OM for the webpage 103 (e.g., static OM, lossless representation of the OM, etc.). The probe script 128 can interact with the browser code 136 (e.g., submit queries, instructions, and/or other requests for access to data in the memory 140) to obtain data from the DOM 142, the CSSOM 146, and the mappings 144, as indicated by block E (158). For example, the probe script 128 can traverse all of the nodes in the DOM 142, including the shadow DOM 150 and its nodes, while retrieving corresponding attributes and information about each of the nodes, which can be returned to the object model builder 126, as indicated by block F (160). The probe script 128 can traverse all of the nodes in the DOM 142 when, for example, the webpage 103 is rendered in the browser 119. In some implementations, the probe script 128 can traverse only a portion of the nodes in the DOM 142 that correspond to links or other pointers that are provided by the user through the CMS interface presented in the browser 118.

The object model builder 126 can build a static OM 166 of the dynamic webpage as rendered by the browser 132, as indicated by block G F (162). The object model 166 can be output, as indicated by step G (164), which can permit for accurate and lossless analysis of the dynamically rendered webpage 103 by other systems, such as the web content analysis system 102, without having to separately render the webpage 103 at/by such systems.

The probe script 128 may obtain the data from the memory 140 after one or more events occur for the webpage 103, such as a loading event having occurred indicating that the webpage 103 has loaded in memory 140. In some instances, the data retrieved by the probe script 128 may be limited to only data from memory 140 that is retrieved on loading of the page, meaning that the resulting OM 166 represents the webpage 103 as initially loaded/rendered. In some other instances, the probe script 128 can provide simulated input, commands, and/or other instructions to the browser code 136 to cause the different states 124a-n of the dynamic content 122 from the browser 118 to be rendered in memory 140, and data for each of those states 124a-n can be retrieved by the probe script 128 and incorporated into the resulting OM 166 for the webpage 103.

Accordingly, the static OM 166 can be outputted in block H (164) to the web content analysis system 102. As described herein, the web content analysis system 102 can efficiently ingest the static OM 166 into a content check pipeline and execute one or more content check services based on the static OM 166. Results from the content check(s) can be transmitted from the web content analysis system 102 to the client device 112. In the browser 118, the results can be presented in the CMS interface, such as in a CMS plugin (the plugin 174 described in FIG. 1) that is presented with the static content 120 and the dynamic content 122 of the webpage 103. Sometimes, the results may not be displayed in the context of a rendered previous of the webpage 103. The results may be viewed as a list of potential or current issues within an overlay of the CMS plugin.

Figure 2B:
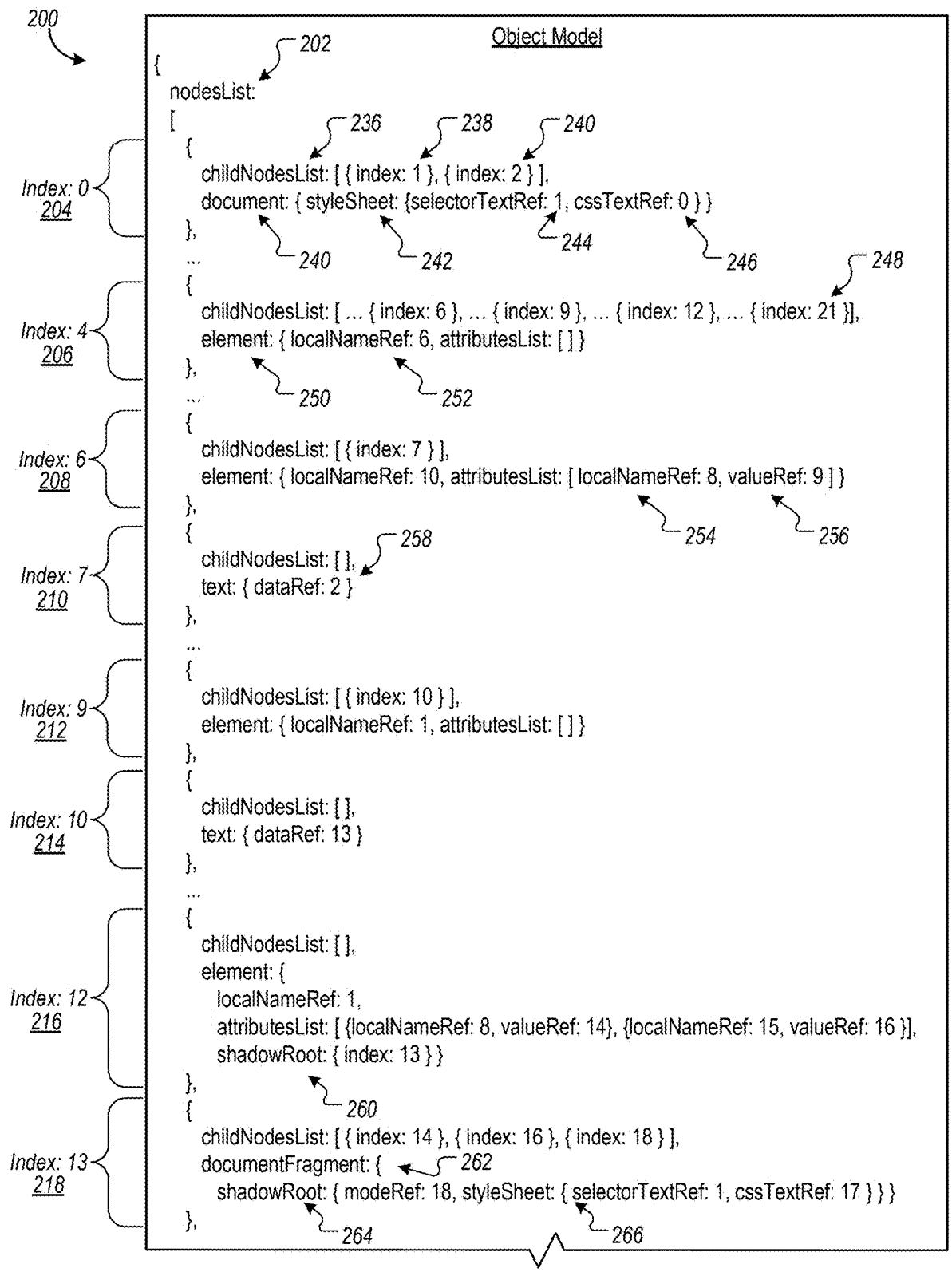

FIGS. 2B-C depict an example object model 200 generated using node and string references. The example object model 200 can be generated by any of a variety of processes, such as the processes described above with regard to FIGS. 1 and 2A. The object model 200 is further described in U.S. Provisional Application Ser. No. 63/279,063, entitled GENERATING LOSSLESS STATIC OBJECT MODELS OF DYNAMIC WEBPAGES, filed on Nov. 12, 2021, the disclosure of which is incorporated by reference in its entirety.

The example object model 200 includes a node list 202 with example node list entries 204-234 and a string list 268 with example string list entries 270-272. The example node list entries 204-234 are identified with their node list index values (e.g., "index: 4"), and the example string list entries 270-272 are designated in-line with their corresponding string list index values (e.g., "0: 'font-weight: bold'"). The index values are presented for illustrative purposes, and are not required to be part of the resulting object model 200.

For the first node entry 204 (at node list index "0"), there are two child nodes 238-240 designated as part of the "childNodeList" element 236. These child nodes 238-234 are identified by their corresponding index value in the nodesList 202. The first node entry 204, which could be considered to be the root node, also identifies the "document" element 240 includes a stylesheet element 242 with a selectorTextRef element 244 and a cssTextRef element 246. In the depicted example, elements ending in the suffix "-Ref" refer to an index value for the string list 268. Accessing the string list 268, the value for the selectorTextRef element 244 is "div" (string list element 272 at string list index "1"), and the value for the cssTextRef element 246 is "font-weight: bold" (string list element 270 at string list index "0").

The node entry 206 (node list index "4") includes child nodes 248 that directly and indirectly correspond to regular portions of the DOM, such as nodes 208-216, and also nodes that identify and correspond to the shadow DOM, such as the shadowRoot node 218 (node list index "13"), which is identified in node 216 by the shadowRoot element 260, and the child nodes 220-230 of the shadowRoot node 218. The shadowRoot node 218 includes a document fragment element 262, which identifies the shadowRoot 264 along with the corresponding styles 266 that apply to the document fragment. Nodes for the regular DOM and the shadow DOM can be interspersed within the node list 202, and can also share string list values for common string values based on their corresponding string identifier.

Any of a variety of different elements can use the same string list and values, such as for "element" 250 and its localNameRef element 252, the localNameRef 254 and valueRef 256 that are part of an attributesList, and a dataRef 258. As discussed above, the string list can include any string, such as strings identifying styles (e.g., string 270), tags (e.g., string 272), and scripts (e.g., string 274).

The example object model 200 that is depicted in the example corresponds to the simplified example webpage that is described above with regard to FIG. 2. When cross-referencing the various node and string indices, the following elements are provided by the object model 200:

Node 206: corresponds to the "<body>" element in the DOM 212,

Nodes 208-210: correspond to the definition of the "styleA" element in the DOM 212 and the CSSOM 214, Nodes 212-214: correspond to the "<div>" element with the text "List Title" in the DOM 212, Nodes 216-218: correspond to the "#shadow-root" element in the DOM 212, Nodes 220-222: correspond to the "<div>" element with the text "List item 1" in the DOM 212, Nodes 224-226: correspond to the "<div>" element with the text "List item 2" in the DOM 212, and Nodes 228-234: correspond to the definition of the "styleB" element in the DOM 212 and CSSOM 214.

Figure 3:
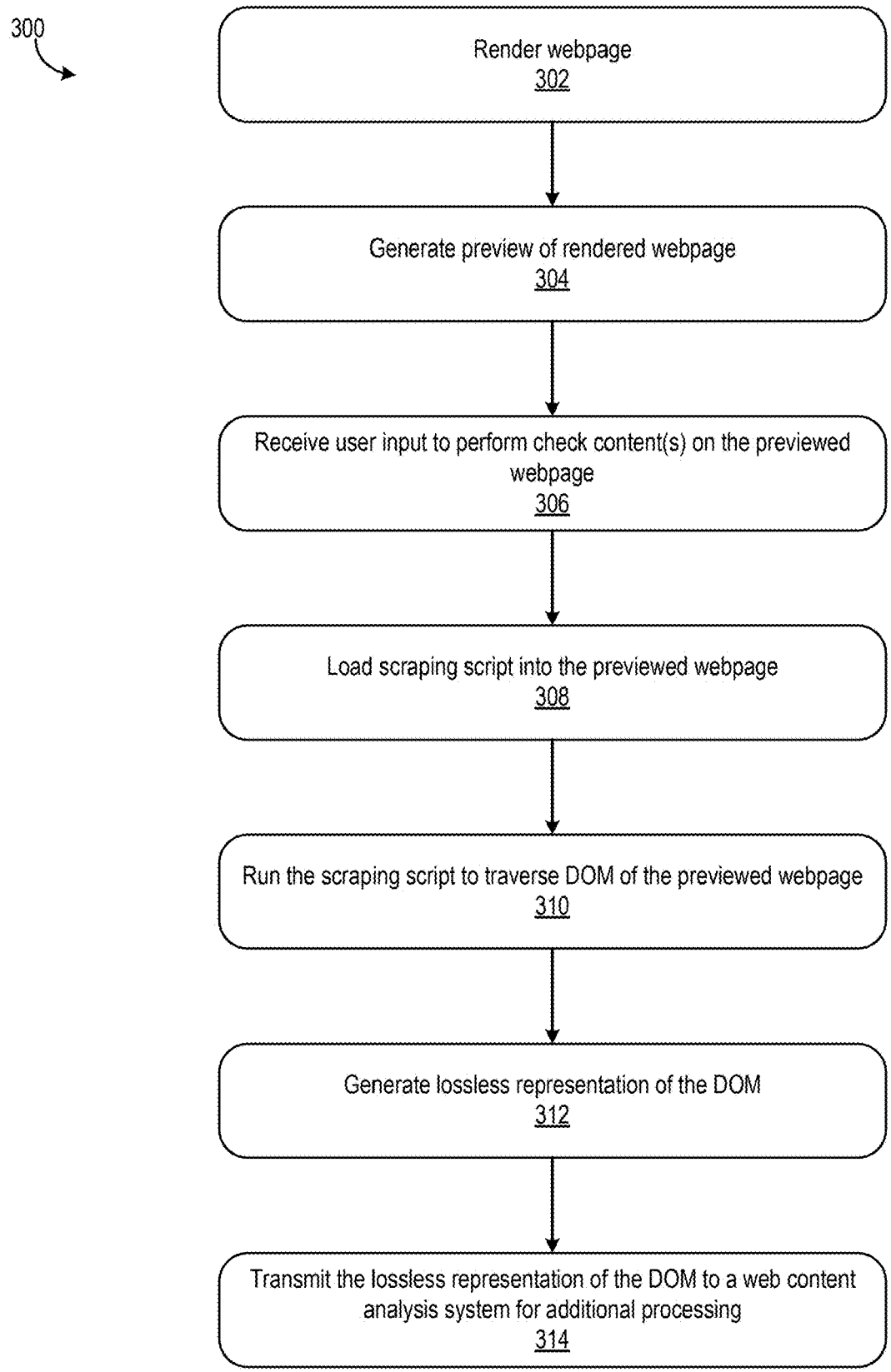
FIG. 3 is a flowchart of an example process for direct ingestion of a DOM of a webpage that is previewed in a web browser at a client computing device.

FIG. 3 is a flowchart of an example process 300 for direct ingestion of a DOM of a webpage that is previewed in a web browser at a client computing device. Therefore, the process 300 can be performed when a webpage is previewed at the client computing device, such as in a content management service (CMS) presented in a browser at the client computing device. A previewed version of the webpage can provide a relevant user with functionality to review and modify content in the webpage. This edited version of the webpage can then be ingested at the client computing device to generate a static OM for the webpage that can then be transmitted to a web content analysis system for additional processing. The additional processing can include performing one or more web content services to check content in the previewed webpage and determine whether the previewed webpage contains any potential issues, errors, accessibility compliance issues, spelling errors, readability issues, etc. Results from this additional processing can be returned to the client computing device and presented to the user in a plugin that is outputted with the previewed webpage in the browser. The user can review the results in the plugin and determine one or more changes to make to the previewed webpage. The additional processing can be performed as part of a pre-publish content check before the previewed webpage is published and made available to end users. In some implementations, the additional processing can also be performed once the previewed webpage has been published and the relevant user is making changes/edits to the webpage before being published again.

The process 300 can be performed by the client device 112. The process 300 can also be performed by one or more other client computing devices, computing systems, devices, computers, networks, cloud-based systems, and/or cloud-based services. For illustrative purposes, the process 300 is described from the perspective of a client device.

Referring to the process 300 in FIG. 3, the client device can render a webpage in block 302. The webpage can be a webpage associated with a user of the client device, such as a website owner and/or a website developer. The webpage can be one that has not yet been published. The webpage can also include one that has been published. The client device can render a webpage that the user is interested in reviewing, modifying, and/or publishing. In some implementations, as shown and described in reference to FIGS. 1 and 2A, the webpage can be rendered in a webpage editing tool. The webpage editing tool can be provided by a CMS system and/or a web content analysis system that provides the user with tools to create, edit, and modify webpages. The rendered webpage can be presented in the webpage editing tool with a CMS plugin. The CMS plugin can provide functionality for the user to review content in the rendered webpage, as described throughout this disclosure. Refer to FIGS. 1 and 2A for additional discussion about rendering the webpage at the client device.

In block 304, the client device can generate a preview of the rendered webpage. The preview can be an editable version of the webpage. In other words, the user can make modifications to content presented in the previewed version of the webpage. When the user makes modifications/edits, the user can then view, in real- or near real-time, how the webpage would appear with such modifications. In some implementations, the webpage editing tool can present the user with the option to preview the rendered webpage in the browser. In some implementations, generating a preview of the webpage can be provided by the web content analysis system through a framework of the CMS plugin.

The client device can also receive user input to perform one or more content check(s) on the previewed webpage in block 306. The user input can be received from the CMS plugin framework. The CMS plugin can present one or more options from which the user to select. An example option can include performing a pre-publish content check on the content presented in the previewed webpage. Performing the pre-publish content check can provide results to the user about whether the content of the previewed webpage is ready to be published and made available to end users. The pre-publish content check can include checking various aspects of the content of the previewed webpage, such as accessibility, readability, SEO, and spelling. Another option can include performing an accessibility check on the content in the previewed webpage. Checking accessibility can provide results to the user in the CMS plugin about whether the content of the previewed webpage meets one or more accessibility standards. Other options can also be presented in the CMS plugin to run one or more other user-selected content checks on the content of the previewed webpage, as described throughout this disclosure.

In block 308, the client device can load a scraping script into the previewed webpage. In some implementations, the scraping script can be loaded before the preview of the webpage is generated. In some implementations, block 308 can be performed before the webpage is even rendered in block 302. In yet some implementations, block 308 may be performed before the client device receives user input. The scraping script can be loaded into the webpage editing tool and can have one or more JavaScript (JS) functions for scraping content of a webpage that is rendered and previewed in the webpage editing tool.

Next, the client device can run the scraping script to traverse a DOM of the previewed webpage (block 310). Running the scraping script can include exposing scraping code as a JS function and/or library. The client device can then scrape the DOM of the previewed webpage inside the browser. The client device can perform scraping functions that a crawler at the web content analysis system would typically perform on dynamic webpage content that has been packaged at the client device and transmitted to the web content analysis system for generating a static OM of the dynamic webpage content.

The client device can generate a lossless representation of the DOM based on running the scraping script in block 312. In other words, scraping results can be packaged into a static OM of the previewed webpage. The static OM can be the lossless representation of the DOM, as described throughout this disclosure. The static OM can also be a flat DOM, as described throughout this disclosure.

In block 314, the client device can transmit the lossless representation of the DOM to the web content analysis server system (e.g., the web content analysis system 102 in FIG. 1) for additional processing. An ingester of the web content analysis system can be exposed to an API that accepts the lossless representation of the DOM. Once the lossless representation of the DOM is ingested into the web content analysis system, the lossless representation of the DOM can be posted down a content check pipeline and consumed by one or more web analysis services that correspond to the user-selected content checks.

Transmitting the lossless representation of the DOM to the web content analysis system can result in bypassing internal rendering (e.g., ingestion, scraping, and/or crawling) at the web content analysis system before the previewed webpage can be checked according to the user input in block 306. By saving computational resources and processing power that typically would be used in internal rendering, the client-generated lossless representation of the DOM can simply be ingested down a content check pipeline of the web content analysis system (e.g., to one or more web analysis services) to quickly and accurately perform the one or more content checks for the webpage.

Figure 4:
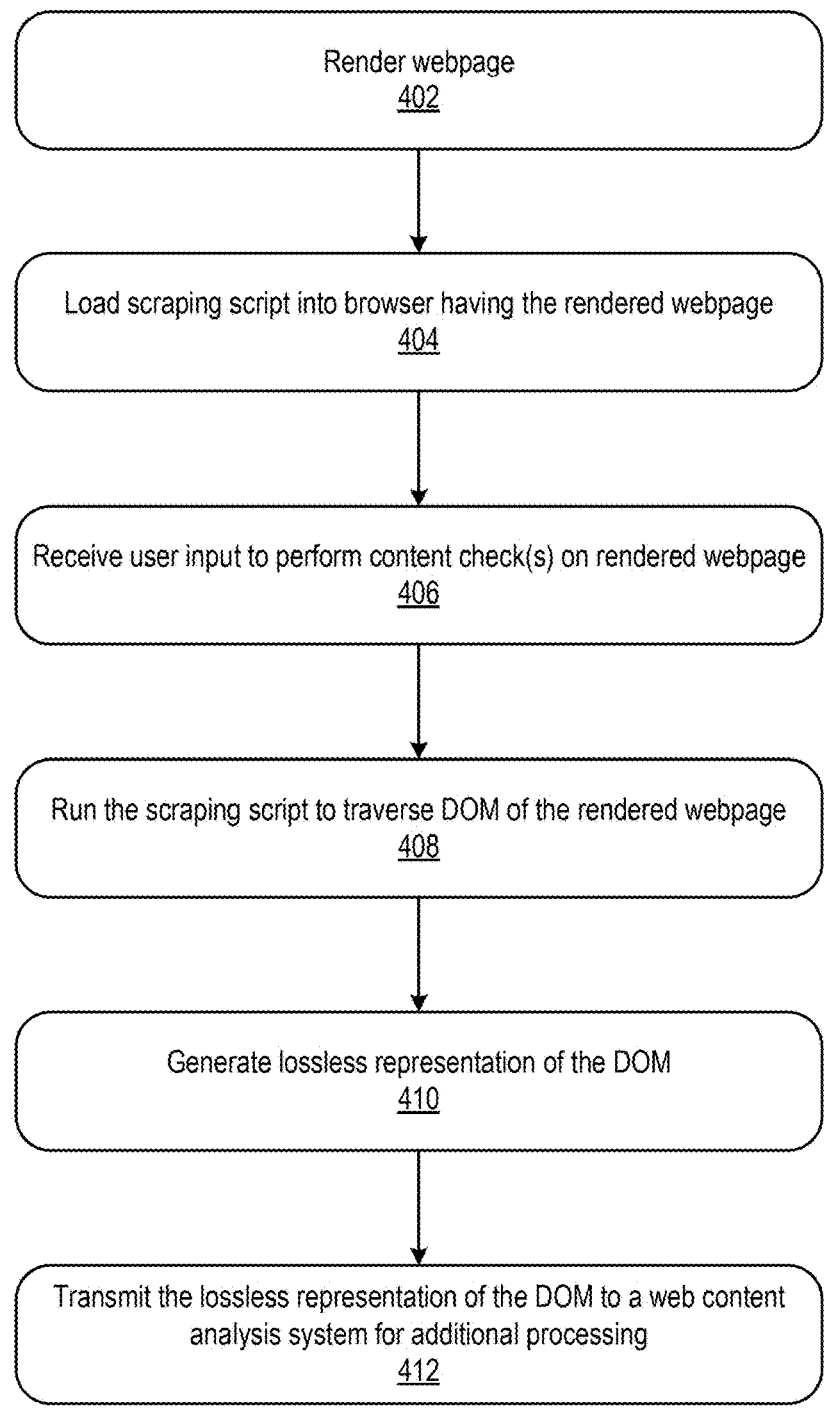
FIG. 4 is a flowchart of an example process for direct ingestion of a DOM of a webpage that is rendered in a web browser at a client computing device.

FIG. 4 is a flowchart of an example process 400 for direct ingestion of a DOM of a webpage that is rendered in a web browser at a client computing device. Whereas the process 300 can be performed when the webpage is previewed in a web browser at the client computing device, the process 400 can be performed when the webpage is merely rendered in the web browser and not previewed. The process 400 can, for example, be performed using the web browser 119 described in FIG. 2A. The process 400 can be performed by the client device 112. The process 400 can also be performed by one or more other client computing devices, computing systems, devices, computers, networks, cloud-based systems, and/or cloud-based services. For illustrative purposes, the process 400 is described from the perspective of a client device.

Referring to the process 400 in FIG. 4, the client device can render a webpage in block 402, as described throughout this disclosure (e.g., refer to block 302 in the process 300 of FIG. 3). The webpage can be rendered in a CMS interface, such as the webpage editing tool 170 described in reference to FIG. 1. The client device can render the webpage that the user of the client device desires to review, edit, modify, change, and/or publish.

In block 404, the client device can load a scraping script (such as the probe script 128 described in reference to FIG. 2A) into a browser having the rendered webpage. As described herein, the scraping script can be used to traverse/scrape a DOM or other OMs (e.g., CSSOM) of the rendered webpage directly on the client device. In some implementations, the scraping script can be loaded into the browser before or after one or more other blocks in the process 400. For example, the scraping script can be loaded into the browser before rendering the webpage in block 402. The scraping script can be loaded into the browser when the CMS interface is accessed/presented at the browser, for example. In some implementations, the scraping script can be loaded into the browser after block 406, described below. Refer to block 308 in the process 300 of FIG. 3 for additional discussion about loading the scraping script into the browser at the client device.

In block 406, the client device can receive user input to perform one or more content checks on the rendered webpage. Refer to description throughout this disclosure, for example in reference to block D in FIG. 1 and block 306 in the process 300 of FIG. 3.

Receiving the user input can trigger the client device to execute/run the scraping script and traverse the DOM of the rendered webpage (block 408). Since the scraping script has already been loaded into the browser, the client device can execute it to scrape the DOM in real- or near real-time.

In block 410, the client device can generate a lossless representation of the DOM based on running the scraping script. As described herein, the lossless representation of the DOM can be a static OM or a flat OM. Refer to FIG. 2A for additional description about generating the lossless representation of the DOM.

Next, in block 412, the client device can transmit the lossless representation of the DOM to a web content analysis system, as described herein, for additional processing. The web content analysis system can then directly ingest the lossless representation of the DOM into a content check pipeline (since the web content analysis system does not need to first un-package the DOM and other files of the webpage then scrape/traverse the DOM), thereby improving efficiency and accuracy of executing the content check(s) on the rendered webpage and returning content check(s) results to the user at the client device.

Figure 5:
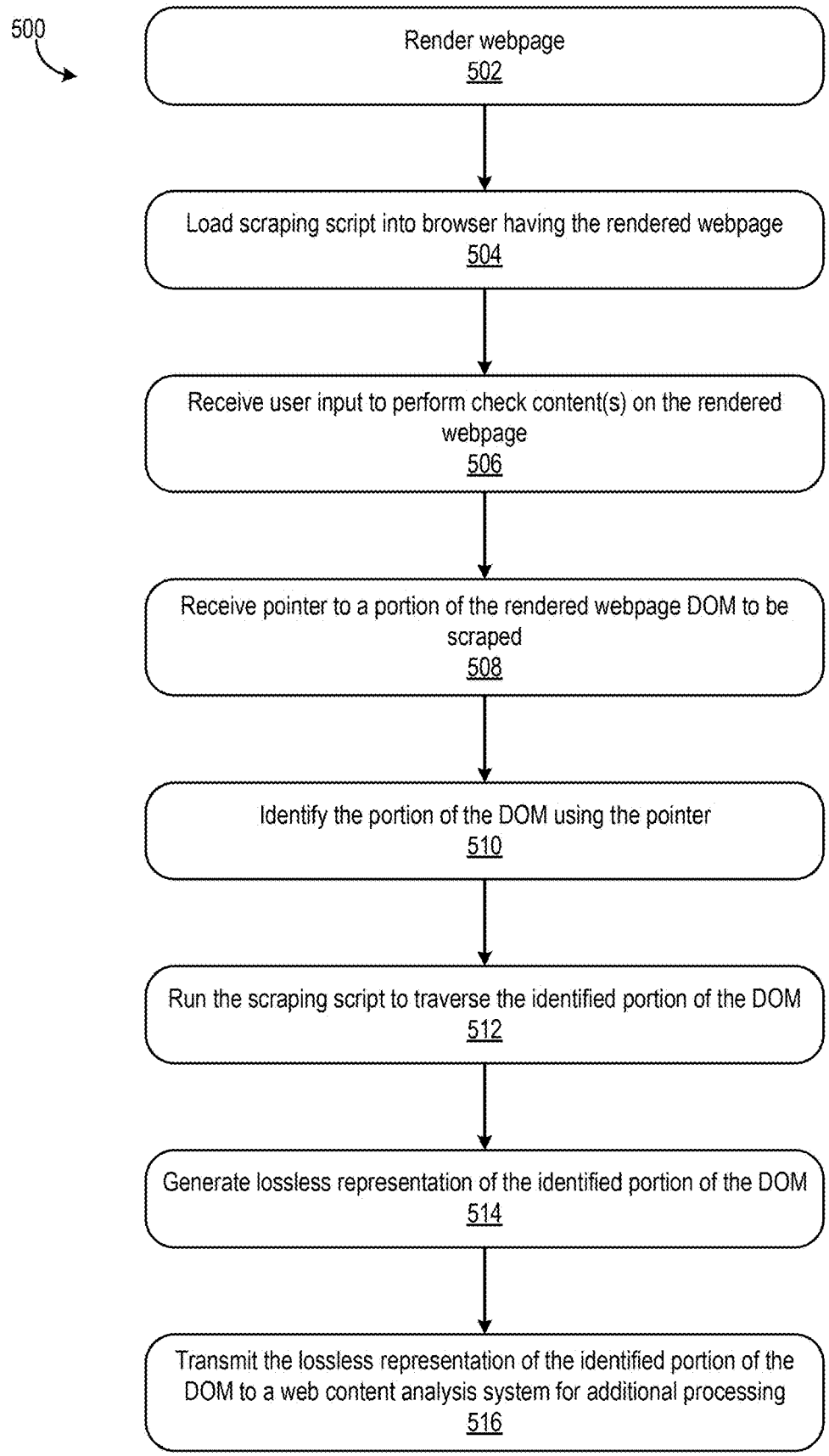
FIG. 5 is a flowchart of an example process for direct client-side ingestion of a portion of a DOM of a webpage.

FIG. 5 is a flowchart of an example process 500 for direct client-side ingestion of a portion of a DOM of a webpage. In the processes 300 and 400, an entire DOM of the webpage can be ingested and crawled, for example when the webpage is simply rendered at the client device and not previewed or presented in a CMS interface (e.g., the webpage editing tool 170). In the process 500, a client computing device can receive a pointer or other identifier for a particular portion or content of the DOM to be ingested and crawled. This pointer can be received from the CMS interface through which the webpage is rendered and previewed to the user of the client device. The process 500 can be performed, for example, using the web browser 118 described in reference to FIG. 2A. The process 500 can be performed by the client device 112. The process 500 can also be performed by one or more other client computing devices, computing systems, devices, computers, networks, cloud-based systems, and/or cloud-based services. For illustrative purposes, the process 500 is described from the perspective of a client device.

Referring to the process 500 in FIG. 5, the client device can render a webpage in block 502. Refer to block 302 in the process 300 of FIG. 3 for additional discussion about rendering the webpage at the client device. For example, the webpage can be rendered in the CMS interface, such as the webpage editing tool 170. The user can desire to preview the webpage in the CMS interface such that the user can update, modify, or otherwise change content in the webpage before it is published.

The client device may load a scraping script into a browser having the rendered webpage in block 504. Refer to block 404 in the process 400 of FIG. 4 for additional discussion about loading the scraping script. For example, in some implementations, the scraping script can be loaded in the browser when the user selects or otherwise accesses the CMS interface in the browser. In some implementations, the scraping script can be loaded into the browser after block 510.

In block 506, the client device can receive user input to perform one or more content checks on the rendered webpage. Refer to description throughout this disclosure, for example in reference to block D in FIG. 1, block 306 in the process 300 of FIG. 3, and block 406 in the process 400 of FIG. 4.

The client device can also receive a pointer to a portion of the rendered webpage DOM to be scraped (block 508). Sometimes, block 508 can be performed as part of block 506. For example, the user input in block 506 can include user indication of one or more content in the webpage that should be checked. The user, as an illustrative example, may only want to check for spelling errors in the webpage or a particular text box in the webpage. The user can indicate this by providing input through the CMS interface. The input can include a link to the particular text box, a selection of the text box, or another identifier for the text box. As another example, the user can provide input indicating a desire to check the webpage for compliance with accessibility standards. Based on receiving this input, the client device can identify which portion of the webpage's DOM relates to accessibility standards. The client device can therefore identify a pointer for that particular portion of the webpage's DOM.

The client device can identify the portion of the DOM using the pointer in block 510. The client device can access files of the webpage that are received from a web server system when rendering the webpage at the client device (e.g., in block 502). The client device can then search the files for and identify the portion of the DOM that corresponds to the pointer.

The client device can then run the scraping script to traverse the identified portion of the DOM in block 512. The scraping script can be executed on just the identified portion of the DOM rather than the entire DOM. This can provide for efficient use of processing power and compute resources since only the portion of the DOM that is relevant to performing the content check(s) may be traversed/scraped.

In block 514, the client device can generate a lossless representation of the identified portion of the DOM. As described herein, the lossless representation can be a static OM or flat OM. This lossless representation of the DOM may be smaller in size than a lossless representation of the entire DOM, which can result in faster and more efficient transmission to other systems, such as a web content analysis system.

As described herein, the client device can then transmit the lossless representation of the identified portion of the DOM to the web content analysis system for additional processing (block 314). The lossless representation of the identified portion of the DOM can be quickly and efficiently ingested directly into a content check pipeline. Web content analysis services can receive the lossless representation in the pipeline and perform their respective content checks on only the identified portion of the DOM, thereby providing accurate and quick generation of content check results. After all, the services can generate more accurate results that are specific to the identified portion of the DOM rather than the entire DOM, which can be used by the user at the client device to quickly and accurately modify content in the webpage that corresponds to the identified portion of DOM before publishing the webpage.

Figure 6:
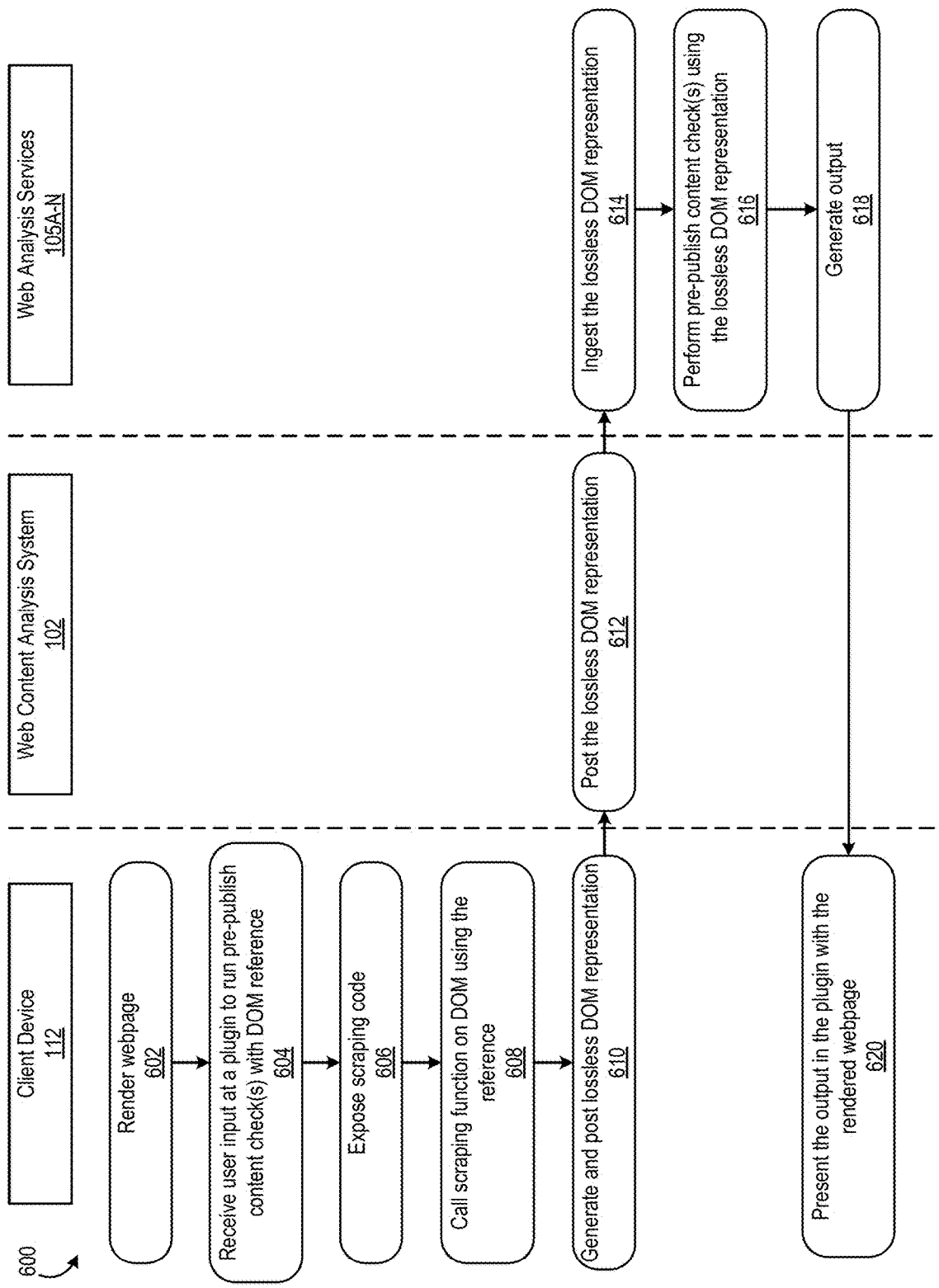
FIG. 6 is a swimlane diagram of an example process for generating a lossless representation of a webpage DOM.

FIG. 6 is a swimlane diagram of an example process 600 for generating a lossless representation of a webpage DOM. The process 600 is described from the perspective of components described herein, such as the client device 112, the web content analysis system 102, and the web analysis services 105A-N. The process 600 can also be performed by one or more other components, computing systems, devices, and/or network of devices/computing systems. For example, the client device can run one or more components and/or modules that can perform one or more blocks described in the process 600. The client device 112 can run, for example, a web browser, a CMS service/platform, one or more scripts, and a CMS plugin.

Referring to the process 600 in FIG. 6, the client device 112 can render a webpage in block 602. As described throughout this disclosure, the webpage can be rendered in a web browser at the client device 112. The browser can include a CMS interface, such as the webpage editing tool 170 described in reference to FIG. 1. Therefore, the webpage can be rendered in the CMS interface and the user may preview, edit, and/or modify content in the webpage. The webpage can also be rendered in a web browser that does not include the CMS interface.

In block 604, the client device 112 can receive user input at a plugin to run one or more pre-publish content checks with a DOM reference for the rendered webpage. The plugin can be provided by the web content analysis system 102. The plugin can be presented in the browser with the rendered webpage at the client device 112. The plugin can provide a user at the client device 112 with one or more options to check the content of the webpage for quality, accuracy, and other attributes. The plugin can include a selectable option (e.g., a button) to run the content check(s) on content of the rendered webpage. In some implementations, the CMS interface can include the selectable option to run the content check(s). The user input received in block 604 can include selection of the option to run the content check(s). The user input can also include the DOM reference, which can be in many forms, such as a link, a URL, an identifier, or another type of pointer that can correspond with a particular portion of the webpage's DOM. In some implementations, the client device 112 may determine the correct DOM reference based on the user's selection of which content check(s) to perform. Moreover, in some implementations, more than one DOM reference can be provided in block 604.

The client device 112 can then expose scraping code in block 606. The scraping code can be exposed through a scraping script (e.g., the probe script 128 in FIG. 2A) that is loaded at the client device 112. The scraping script can be received from the web content analysis system 102. For example, the client device 112 can receive the scraping script before the process 600 begins and thus load the script at the client device 112. In some implementations, the scraping script can be received and loaded into the browser at the client device 112 before, during, or after blocks 602 and/or 604. Moreover, in some implementations, the scraping code can be exposed (block 606) before, during, or after block 602 and/or before or during block 604.

In block 608, the client device 112 can call a scraping function on the DOM using the reference. The client device 112 is capable of scraping the DOM through integration of the plugin from the web content analysis system 102. The scraping function can be called on a particular portion of the DOM that corresponds to the DOM reference received in block 604. As a result, the client device 112 may only scrape a portion of the DOM that would be used in the content check(s) designated in block 604. This can provide for quick, efficient, and accurate scraping at the client device 112.

The client device 112 can then generate and post a lossless representation of the scraped DOM (block 610), which can be posted by the web content analysis system 102 (block 612). The client device 112 is capable of generating the lossless representation of the scraped DOM through integration of the plugin from the web content analysis system 102. As described herein, the lossless representation can be a flat OM or a static OM.

By posting the lossless representation of the DOM at the web content analysis system 102, the web analysis services 105A-N can ingest it in block 614. In other words, the lossless representation of the portion of the DOM that corresponds to the DOM reference can be directly fed into a content check pipeline at the web content analysis system 102 without requiring the system 102 to first ingest, crawl, scrape, and/or un-package files for rendering the webpage.

The web analysis services 105A-N can then perform the pre-publish content check(s) on the lossless representation of the DOM in block 616. Each of the services 105A-N can, for example, receive the lossless representation of the DOM and perform its respective content check(s) on that lossless representation of the DOM.

The web analysis services 105A-N can generate output based on performing the pre-publish content check(s) in block 618. Each service 105A-N can generate results and/or output based on executing its respective content check(s). Once the output is generated, it can be transmitted from each web analysis service 105A-N to the client device 112. The output can be transmitted to the client device 112 in real-time or near real-time as each of the services 105A-N completes its respective content check(s) and generates its respective output. For example, a first service can generate output first, which can then be transmitted to and presented at the client device 112 while one or more other services are still running and/or generating their respective output. The plugin can therefore be updated in real-time, as results and output are generated by each of the services 105A-N that are executing their respective check(s).

As mentioned above, the output can be presented in the plugin with the rendered webpage in the browser (block 620). Integration, via the plugin, with the web content analysis system 102 and the web analysis services 105A-N can provide for this dynamic display of information to be presented to the user at the client device 112. As a result, the user can make decisions about modifying the content of the webpage that was checked and/or publishing the webpage.

Figure 7:
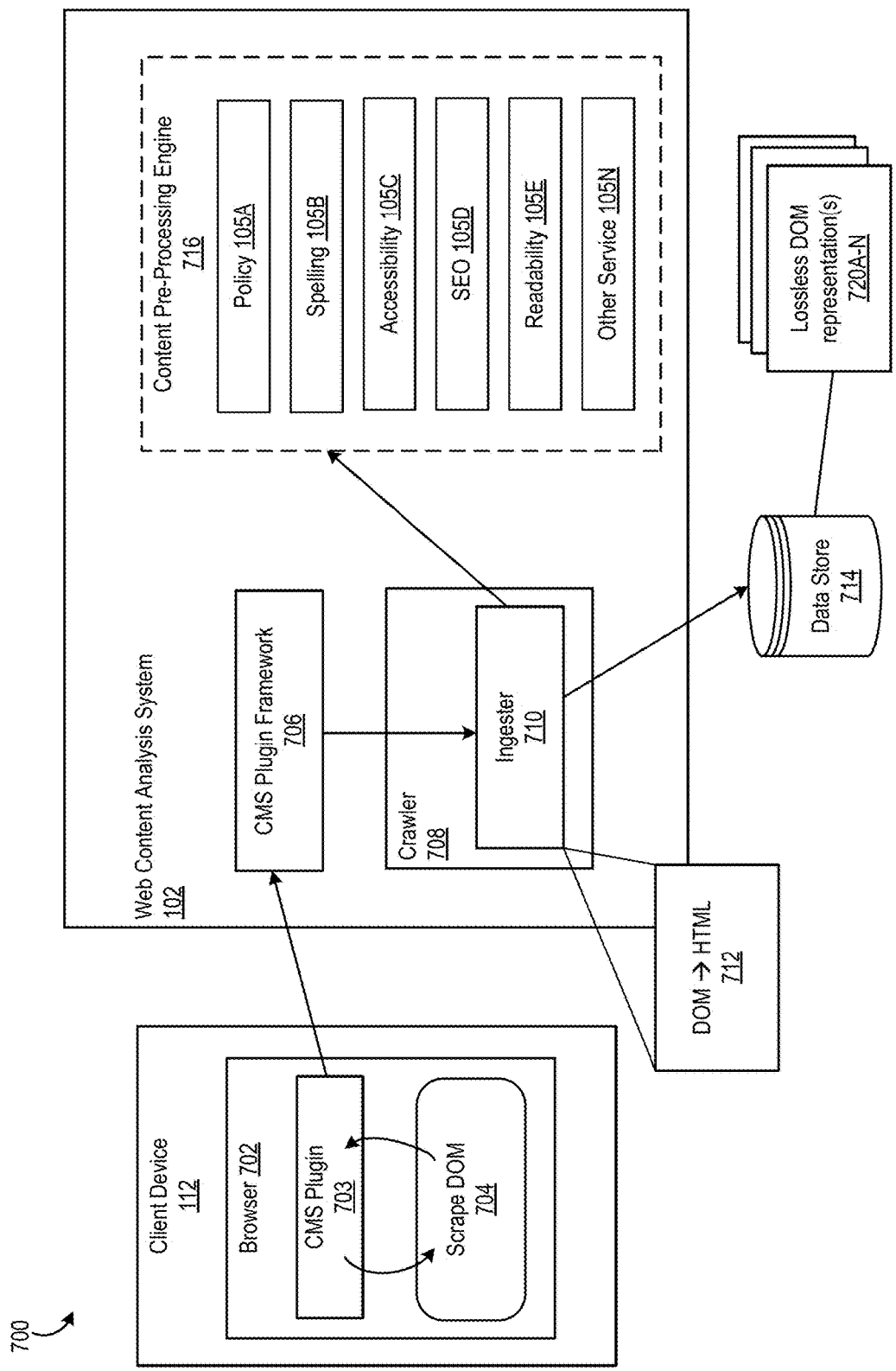
FIG. 7 is a block diagram of an example process for generating a lossless representation of a webpage DOM.

FIG. 7 is a block diagram of an example process 700 for generating a lossless representation of a webpage DOM. The process 700 is similar to the processes described in reference to FIGS. 1-6.

Referring to the process 700, a webpage can be rendered in a browser 702 at the client device 112. The webpage can be rendered in a CMS interface, such as the webpage editing tool 170 described in FIG. 1. A CMS plugin 703 provided by the web content analysis system 102 can also be presented in the browser 702 along with the rendered webpage. The CMS plugin 703 can provide integration between the client device 112 and the web content analysis system 102 such that a DOM (or other OM(s)) of the webpage can be scraped in the browser 702 at the client device 112 (704). As described herein, a scraping script can be loaded into the browser 702 at the client device 112 via the CMS plugin 703 integration with the system 102. Scraping code in the script can be executed to generate the lossless representation of the DOM at the client device 112.

The lossless representation of the DOM can be transmitted from the client device 112 (via the CMS plugin 703, for example) to a CMS plugin framework 706 at the web content analysis system 102. The CMS plugin framework 706 can provide for communication/integration between the system 102 and the CMS plugin 703 at the client device 112.

Next, the CMS plugin framework 706 can post the lossless representation of the DOM such that it can be ingested by a crawler 708 and an ingester 710 of the web content analysis system 102. Components of the web content analysis system 102 that are downstream the crawler 708 in the content check pipeline can therefore use the lossless representation of the DOM in executing their respective functions/tasks. Traditionally, the crawler 708 and the ingester 710 may be configured to ingest, scrape, and render the DOM of the webpage. However, the disclosed technology provides for shifting these actions of the crawler 708 and ingester 710 to the client device 112 (via the scraping script that is loaded at the client device 112 web browser 702 via the CMS plugin 703) to improve efficiency and accuracy of generating a lossless representation of the DOM to be used in a content check pipeline. Therefore, the web content analysis system 102 receives the lossless representation of the DOM based on the webpage that was rendered and scraped at the client device 112. The system 102 may not receive a package of all content for the webpage that the system 102 (more particularly, the crawler 708 and/or the ingester 710) would then have to un-package, render, and scrape. Instead, the disclosed technology provides for efficiently offloading computationally intensive scraping and rendering techniques to the client device 112 to increase efficiency and accuracy of the content check pipeline at the web content analysis system 102.

For example, the ingester 710 can flatten the DOM into static HTML for some of the web content analyses described herein. Some web content analysis services may require original HTML to determine issues. For example, W3C accessibility HTML validators and other similar engines/services may require running on the original HTML. Therefore, the ingester 710 can convert the DOM into HTML for various services to properly execute.

The lossless representation of the DOM can be stored in a data store 714 as data 720A-N. The ingester 710, for example, can post the lossless representation of the DOM to the data store 714. Although depicted as being separate from the web content analysis system 102, in some implementations, the data store 714 can be part of the system 102. One or more of the web analysis services 105A-N described herein can retrieve the lossless representation of the DOM 720A-N from the data store 714 to be used in subsequent content checks. In some implementations, one or more other services and/or engines of the web content analysis system 102 may retrieve the lossless representation of the DOM 720A-N from the data store 714 for additional or further processing.

By passing through the crawler 708 and the ingester 710, the lossless representation of the DOM can be quickly, easily, and efficiently routed down the content check pipeline to one or more web analysis services 105A-N. The web analysis services 105A-N can optionally be part of a content pre-processing engine 716 in the web content analysis system 102. In some implementations, one or more of the services 105A-N may be independent of each other and/or may not be part of the engine 716. In yet some implementations, one or more of the services 105A-N may be separate from the web content analysis system 102.

One or more of the services 105A-N may be selected to run using the lossless representation of the DOM. The services 105A-N can be selected based on a subscription plan of the user, which can indicate which services 105A-N the user is eligible to use in checking their webpage. Each of the services 105A-N can receive the lossless representation of the DOM and execute their respective content check(s). Results from the content check(s) can be transmitted to the client device 112 and presented in the CMS plugin 703 in the browser 702.

The web analysis services 105A-N can include policy 105A, spelling 105B, accessibility 105C, search engine optimization (SEO) 105D, readability 105E, and one or more other services 105N that can provide valuable insight about potential issues and accidental errors in the webpage content before publishing. Results from the assessments performed by the services 105A-N can be stored in the data store 714 and internally identified by a content ID associating the user of the client device 112 with the webpage. Depending on the state of processing at each of the services 105A-N, more detailed results for a respective service 105A-N can be requested, but may not be returned to be presented in the plugin 703 until the respective part of that service's processing has yielded results (e.g., been completed). Therefore, results and processing status can be returned to the client device in 112 and presented in the plugin 703 at the client device 112 in real-time, even if the content checking process is not yet complete for the webpage. As any of the services 105A-N complete their respective checks, or parts/portions of their checks, their results can populate the plugin 703. The plugin 703 can be continuously updated as more checks are completed or parts/portions of the checks are completed. As a result, the user at the client device 112 can view results in real-time, and address those results quickly and efficiently before publishing the webpage.

Figure 8:
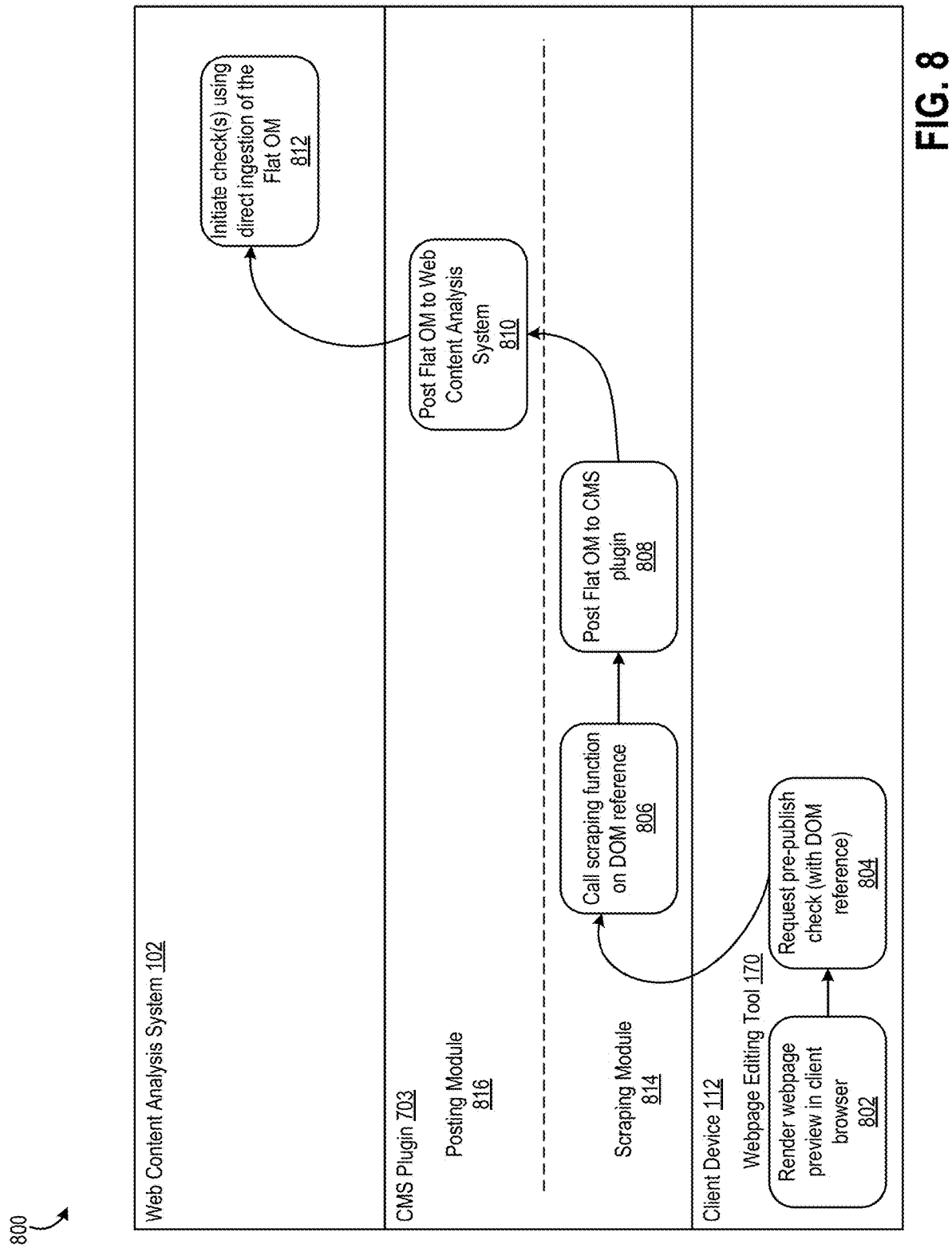
FIG. 8 is a block diagram of an example process for direct ingestion of a DOM of a webpage rendered in a web browser at a client computing device.

FIG. 8 is a block diagram of an example process 800 for direct ingestion of a DOM of a webpage rendered in a web browser at a client computing device. The process 800 is similar to the processes described in reference to FIGS. 1-7.

Referring to the process 800, one or more blocks in the process 800 can be performed by one or more components and/or systems. For example, blocks 802-804 can be performed at the client device 112 in a CMS interface, such as the webpage editing tool 170. Blocks 806 and 808 can be performed in a scraping module 814 deployed in the CMS plugin 703 at the client device 112. Block 810 can be performed in a posting module 816 that is deployed in the CMS plugin 703 at the client device 112. The scraping module 814 and the posting module 816 can be deployed at the client device 112 from a scraping script that is provided by the web content analysis system 102 to the client device 112 through integration with the CMS plugin 703. Once the scraping script is run in the browser of the client device 112, the scraping module 814 and the posting module 816 can be deployed therein. Block 812 can be performed by the web content analysis system 102. One or more of the blocks in the process 800 can be performed by one or more systems, components, and/or modules.

The client device 112 can render a webpage preview in a browser in block 802. As described throughout this disclosure, the webpage preview can be rendered in the webpage editing tool 170, which can be provided by a CMS server. The client device 112 can then request a pre-publish check to be performed on the previewed and rendered webpage in block 804 (e.g., in response to receiving user input to run the pre-publish check). In some implementations, the request can include one or more DOM references, such as links, pointers, or identifiers. The DOM reference(s) can indicate one or more portions of the DOM to be scraped and used in the pre-publish check. The DOM reference(s) can include, but is not limited to, a link to a preview URL for the webpage, a DOM root node, or any other type of identifier that may be requested from the user by the CMS server and/or the web content analysis system 102 in the CMS plugin 703.

The scraping module 814 deployed by the CMS plugin 703 at the client device 112 can call a scraping function on the DOM reference(s) (or the entire DOM if the DOM reference(s) is not included in the request) in block 806. As described throughout this disclosure, the scraping module 814 can scrape the DOM and generate a flat OM of the DOM (e.g., lossless representation of the DOM, static OM, etc.). The scraping module 814 can then post the Flat OM to the CMS plugin 703 in block 808. Since the scraping module 814 scrapes the portion of the DOM that is previewed in the browser at the client device 112, the web content analysis system 102 does not need direct communication with the CMS server that provides the webpage editing tool 170. This can improve efficiency and accuracy in data transmission, as well as utilize fewer compute resources and less processing power.

Moreover, communication between the client device 112 and the web content analysis system 102 via the CMS plugin 703 can reduce potential security risks that may arise from cross-platform communication. After all, collection of input data for the services described herein occurs in the client device 112's web browser. Therefore, the web content analysis system 102 does not require direct access to the CMS system and/or the website. This also means that the website can be entirely internal (e.g., an intranet only accessible on a behind-the-firewall internet protocol (IP)) and can still be checked by the web content analysis system 102 if the user requests the check. Moreover, the scraping script may be embedded into the CMS so that there is implicit trust on the user's behalf.

The posting module 816 deployed by the CMS plugin 703 at the client device 112 can post the flat OM to the web content analysis system in block 810. The web content analysis system 102 can then initiate the pre-publish check using direct ingestion of the Flat OM in block 812. For example, a crawler of the system 102 can ingest the flat OM into a pre-publish check pipeline to run the pre-publish check. One or more web analysis services that correspond to the requested pre-publication check can receive the flat OM in the pipeline and execute their respective functions, as described throughout this disclosure.

In some implementations, the pre-publish check pipeline can be the same as the content check pipeline. In some implementations, the pre-publish check pipeline can be different than the content check pipeline (e.g., the pre-publish check pipeline can be used for webpages that have not yet been published and the content check pipeline can be used for webpages that have been published). Moreover, although the process 800 is described in reference to one pre-publication check, the process 800 can also be applicable to more than one pre-publication check. Each check, as described throughout this disclosure, can check a different aspect of the webpage to determine whether the webpage is ready to be published as-is or should be updated/modified.

Figure 9:
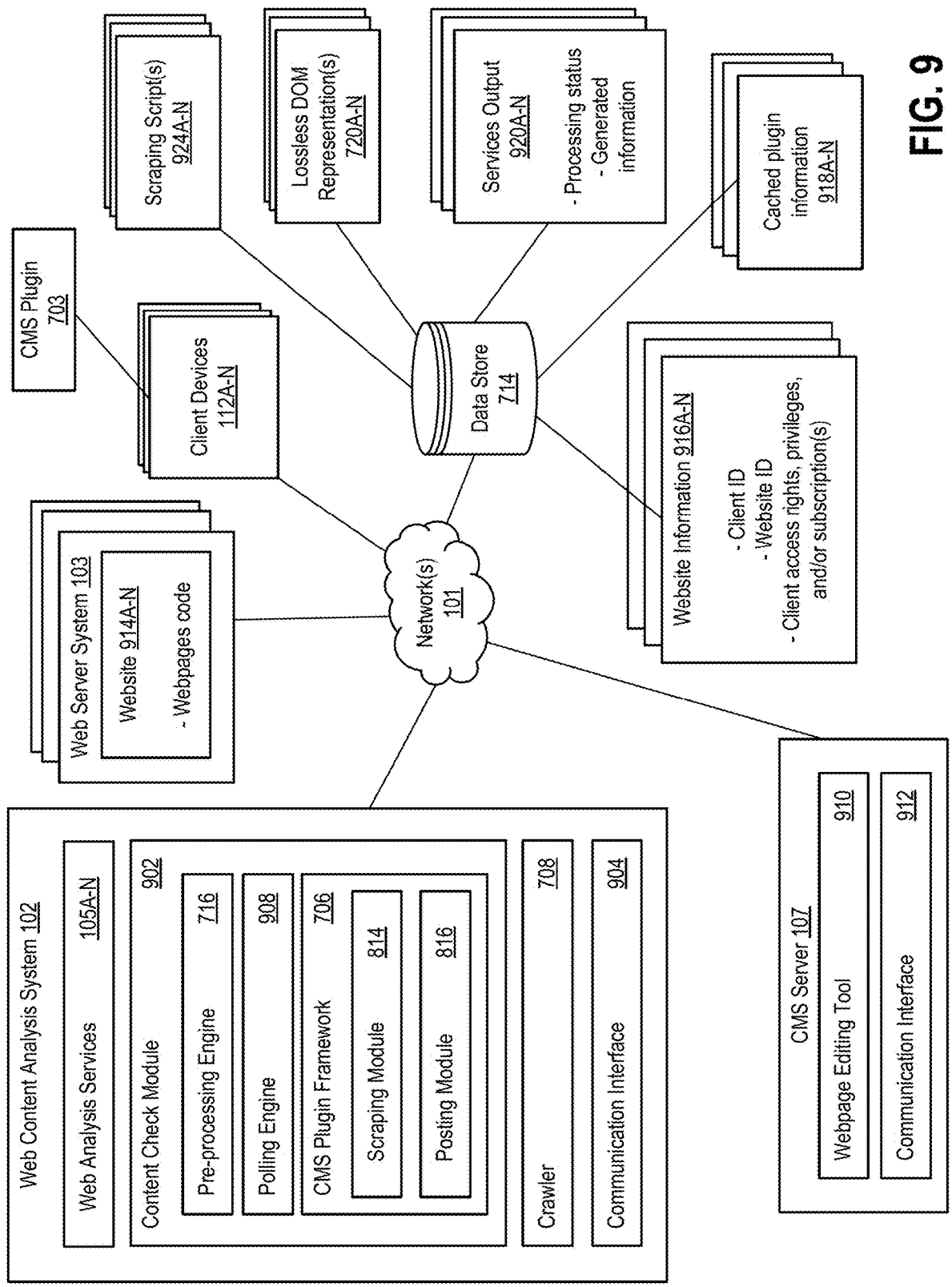
FIG. 9 is a system diagram of one or more components used to perform the techniques described herein.

FIG. 9 is a system diagram of one or more components used to perform the techniques described herein. As described herein, the web content analysis system 102, the client devices 112A-N, data store 714, the web server system 103, and the CMS server 107 can be in communication via the network(s) 101. In brief, the web content analysis system 102 can be any type of computing system, such as a computer or network of computers, and/or a cloud-based computing system and/or service. The client devices 112A-N can be any type of user device or computing device, including but not limited to a computer, laptop, tablet, cellphone, mobile phone, and/or smartphone. Each client device 112A-N can be operated and used by a website owner, client, website operator, or other relevant user.

The data store 714, as described in reference to FIG. 7, can be any type of storage device, including but not limited to cloud storage, a data lake, and/or a database. The data store 714 can maintain information about webpage content, including but not limited to website information 916A-N, cached plugin information 918A-N, services output 920A-N, lossless DOM representations 720A-N, and scraping scripts 924A-N.

In brief, the website information 916A-N can include information about a particular website and/or webpages of the website. The information 916A-N can include, but is not limited to, a client ID, which corresponds to one or more users of the client devices 112A-N who have accounts with the web content analysis system 102, are associated with the website, and/or have rights/privileges to modify the website. The information 916A-N can also include a website ID and client access rights, privileges, and/or subscriptions. The information 916A-N can be used by the web content analysis system 102 to associate a user of a client device 112 with a particular website and particular content check services that may be run for that website.

The cached plugin information 918A-N can include information that can be presented in the CMS plugin 703 at the client devices 112A-N. Some of this information can be presented in real-time in the CMS plugin 703. Some of this information may be linked in the CMS plugin 703 and therefore accessible by clicking on/selecting the link, rather than viewing that information directly in the plugin 703. When the user selects the link, for example, the cached information 918A-N can be retrieved from the data store 714 and used to load another webpage in the browser at the client device 112A-N. The another webpage can provide one or more services (e.g., as offered by the CMS server 107 in some implementations) to review, modify, and/or edit content of the webpage.

The services output 920A-N, as described further below, can include processing statuses and information generated by each of the web analysis services 105A-N executed in a content check pipeline.

In some implementations, multiple data stores or databases can be used to maintain the information 916A-N, 918A-N, 920A-N, 720A-N, and/or 924A-N described throughout this disclosure.

The web server system 103 can be any type of server system, such as a cloud-based server system that host websites. The web server system 103 can maintain code for webpages of a website, to be transmitted to a user device of an end user and/or the client devices 112A-N. The webpage can then be rendered at the respective device, using the code from one or more of the web servers 112A-N.

The CMS server 107, as described herein, can be configured to provide webpage editing tools and content management services to the website owner or other relevant user at the client devices 112A-N. The CMS server 107 can include a webpage editing tool 910 and a communication interface 912. The webpage editing tool 910 can be configured to present the webpage editing tool in a web browser at the client devices 112A-N, as described in this disclosure. The tool 910 can include multiple iFrames for presenting different information about the webpage in a single browser at the client devices 112A-N. One iFrame, for example, can be used to present a rendered version of the webpage content. For example, the user can input a website ID (e.g., URL) at the client devices 112A-N using an input device, such as a keyboard, touchscreen, mouse, and/or microphone. The website ID can be transmitted to the CMS server 107 and used by the tool 910 to retrieve webpage code for that website 914A-N from the web server system 103. The tool 910 can use the code to render particular webpage content in the iFrame and present that rendered webpage content at the client device 112A-N. The tool 910 can also include another iFrame that can be used to present a CMS plugin that is provided by the web content analysis system 102. Finally, the tool 910 can include multiple selectable options (e.g., buttons) that can be selected by the user at the client devices 112A-N to edit, review, and/or publish the webpage content that is presented in the iFrame. The communication interface 912 can provide for communication with one or more other components described herein. Although depicted as separate systems, the CMS server 107 can be part of the web content analysis system 102, in some implementations.

The web content analysis system 102 can provide one or more services to website owners and other relevant users that allow for analysis, editing, and generation of content for websites. The system 102 can include one or more services that can be purchased or selected by the website owner for use in assessing webpage content before and/or after publishing. The system 102 can also populate the CMS plugin with information from the one or more web analysis services 105A-N. The system 102 can therefore provide a customizable, dynamic CMS plugin to each client device 112A-N to be presented concurrently with the webpage editing tool 910 in the browser at the client device 112A-N. The system 102 can include the web analysis services 105A-N, a content check module 902, a crawler 708, and a communication interface 904. Although not depicted, the system 102 may also include one or more processors that are configured to execute instructions to perform one or more of the techniques described throughout this disclosure.

The web analysis services 105A-N, as described throughout this disclosure, can be configured to provide one or more website analytic services to the user at the client device 112A-N. In some implementations, one or more of the services 105A-N can be provided by third party providers. Each of the services 105A-N can be configured to assess different aspects of webpage content. For example, the services 105A-N can be configured to identify different types of potential issues and/or accidental errors in the webpage content that may affect quality of the webpage or compliance with one or more standards. The services 105A-N can include but are not limited to accessibility, policy, misspellings, SEO, ads, and readability services. One or more other services 105A-N can also be included.

When performing pre-publish content checks or content checks described herein, the system 102 can determine which of the services 105A-N to poll based on the respective user's subscription(s). The user's subscription(s), access rights, and/or privileges can be associated with a client ID and stored in website information 916A-N in the data store 714. The web content analysis system 102 can retrieve the subscription(s) from the website information 916A-N in the data store 714 using the client ID to identify which of the services 105A-N are included in the respective website owner's subscription.

The content check module 902 can be configured to perform pre-publication as well as other content checks on webpage content. As described herein, the user can provide user input at the client device 112A-N that indicates selection of an option to publish webpage content and/or perform a content check on the webpage content before publishing. The webpage content and the option can be presented in the webpage editing tool 910 at the client device 112A-N. In some implementations, the option can be presented in the CMS plugin 703 displayed at the browser of the client device 112A-N. The content check module 902 can receive indication of the user input from the client device 112A-N, which can prompt the module 902 to begin the content checking process described throughout this disclosure.

For example, the content check module 902 can include a pre-processing engine 716, a polling engine 908, and a CMS plugin framework 706. Although the components 716 and 706 are shown as being part of the web content analysis system 102 in FIG. 9, one or more of these components can be deployed at the client device 112A-N. As described throughout this disclosure, the web content analysis system 102 can generate the scraping scripts 924A-N, which can be stored in the data store 714. When user input is received at the client device 112A-N to perform a content check, the CMS plugin 703 can retrieve and load the scraping script 924A-N in the browser of the client device 112A-N. Once the scraping script 924A-N is loaded thereon, one or more of the components 716 and/or 706 can execute their functions on the client device 112A-N instead of at the web content analysis system 102.

The CMS plugin framework 706, as described in reference to FIGS. 7-8 can include the scraping module 814 and the posting module 816. The scraping module 814 can be called at the client device 112A-N once the scraping script 924A-N is loaded and executing thereon. The scraping module 814 can therefore be configured to call a scraping function on a DOM, or particular portion of the DOM, of the webpage that is rendered and/or previewed at the client device 112A-N. The scraping module 814 can be configured to generate a lossless representation of the DOM, such as a static OM or a flat OM. The lossless representation of the DOM can then be stored in the data store 714 as 720A-N. The posting module 816 can also be called at the client device 112A-N to post the generated lossless representation of the DOM to the web content analysis system 102.

The posted lossless representation of the DOM can be ingested by the crawler 708 at the web content analysis system 102. Whereas traditionally, the crawler 708 might have performed the functions of the CMS plugin framework 706, the crawler 708 can now simply ingest the lossless representation of the DOM into a content check pipeline: the pre-processing engine 716, for example. In some implementations, the pre-processing engine 716 can include the web analysis services 105A-N. In some implementations, the pre-processing engine 716 can generate instructions for the polling engine 908 to poll particular web analysis services 105A-N to execute their respective checks (e.g., based on the user's subscription(s)).

Once the web analysis services 105A-N are called/executed to check the webpage using the lossless representation of the DOM, the polling engine 908 can continue to poll the services 105A-N to determine processing status updates and whether the services 105A-N have generated any information. Information generated by the services 105A-N, such as results, can be stored as services output 920A-N in the data store 714. The generated information can also be curated into results output, by the CMS plugin framework 706, which can then be presented in the CMS plugin 703 at the client device 112.

The CMS plugin framework 706 can also populate predefined sections of the CMS plugin 703 with the generated information from the services 105A-N. The CMS plugin framework 706 can also cache at least portions of the generated information 920A-N. The framework 706 can then link the cached information 920A-N in the plugin 703 so that this information can be retrieved and presented in the CMS plugin 703 at another time. The framework 706 may continuously update what information is presented in the predefined sections of the CMS plugin 703 as the polling engine 908 continues polling the services 105A-N and the services 105A-N continue to analyze the webpage content. Every time the CMS plugin 703 is populated or otherwise updated, the framework 706 can transmit the CMS plugin 703 to the client device 112A-N to be presented in the webpage editing tool 910 concurrently with the rendered webpage content. The relevant user can view, in the plugin 703, information as it is generated by the services 105A-N while also viewing and editing the rendered webpage content in the webpage editing tool 910. This display can be beneficial to assist the user in quickly and easily reviewing potential issues and/or accidental errors as they are identified by the services 105A-N in real- or near real-time and resolving those issues and/or errors before publishing the webpage content.

Finally, the communication interface 904 can be configured to provide communication between the web content analysis system 102 and components described herein.

Figure 10:
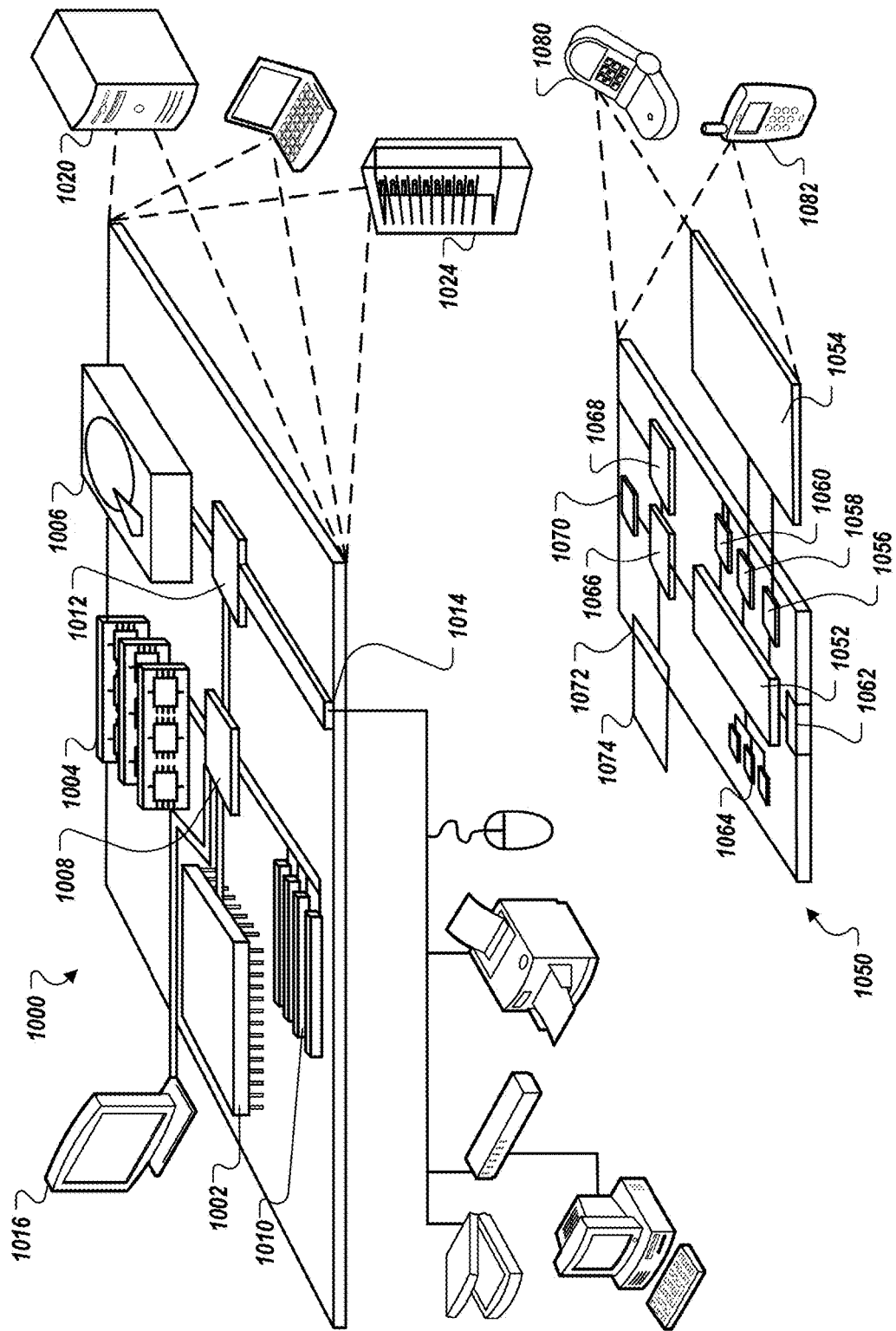
FIG. 10 is a schematic diagram that shows an example of a computing device and a mobile computing device.

FIG. 10 shows an example of a computing device 1000 and an example of a mobile computing device that can be used to implement the techniques described here. The computing device 1000 is intended to represent various forms of digital computers, such as laptops, desktops, workstations, personal digital assistants, servers, blade servers, mainframes, and other appropriate computers. The mobile computing device is intended to represent various forms of mobile devices, such as personal digital assistants, cellular telephones, smart-phones, and other similar computing devices. The components shown here, their connections and relationships, and their functions, are meant to be exemplary only, and are not meant to limit implementations of the inventions described and/or claimed in this document.

The computing device 1000 includes a processor 1002, a memory 1004, a storage device 1006, a high-speed interface 1008 connecting to the memory 1004 and multiple high-speed expansion ports 1010, and a low-speed interface 1012 connecting to a low-speed expansion port 1014 and the storage device 1006. Each of the processor 1002, the memory 1004, the storage device 1006, the high-speed interface 1008, the high-speed expansion ports 1010, and the low-speed interface 1012, are interconnected using various busses, and can be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as a display 1016 coupled to the high-speed interface 1008. In other implementations, multiple processors and/or multiple buses can be used, as appropriate, along with multiple memories and types of memory. Also, multiple computing devices can be connected, with each device providing portions of the necessary operations (e.g., as a server bank, a group of blade servers, or a multi-processor system).

The memory 1004 stores information within the computing device 1000. In some implementations, the memory 1004 is a volatile memory unit or units. In some implementations, the memory 1004 is a non-volatile memory unit or units. The memory 1004 can also be another form of computer-readable medium, such as a magnetic or optical disk.

The storage device 1006 is capable of providing mass storage for the computing device 1000. In some implementations, the storage device 1006 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The computer program product can also be tangibly embodied in a computer- or machine-readable medium, such as the memory 1004, the storage device 1006, or memory on the processor 1002.

The high-speed interface 1008 manages bandwidth-intensive operations for the computing device 1000, while the low-speed interface 1012 manages lower bandwidth-intensive operations. Such allocation of functions is exemplary only. In some implementations, the high-speed interface 1008 is coupled to the memory 1004, the display 1016 (e.g., through a graphics processor or accelerator), and to the high-speed expansion ports 1010, which can accept various expansion cards (not shown). In the implementation, the low-speed interface 1012 is coupled to the storage device 1006 and the low-speed expansion port 1014. The low-speed expansion port 1014, which can include various communication ports (e.g., USB, Bluetooth, Ethernet, wireless Ethernet) can be coupled to one or more input/output devices, such as a keyboard, a pointing device, a scanner, or a networking device such as a switch or router, e.g., through a network adapter.

The computing device 1000 can be implemented in a number of different forms, as shown in the figure. For example, it can be implemented as a standard server 1020, or multiple times in a group of such servers. In addition, it can be implemented in a personal computer such as a laptop computer 1022. It can also be implemented as part of a rack server system 1024. Alternatively, components from the computing device 1000 can be combined with other components in a mobile device (not shown), such as a mobile computing device 1050. Each of such devices can contain one or more of the computing device 1000 and the mobile computing device 1050, and an entire system can be made up of multiple computing devices communicating with each other.

The mobile computing device 1050 includes a processor 1052, a memory 1064, an input/output device such as a display 1054, a communication interface 1066, and a transceiver 1068, among other components. The mobile computing device 1050 can also be provided with a storage device, such as a micro-drive or other device, to provide additional storage. Each of the processor 1052, the memory 1064, the display 1054, the communication interface 1066, and the transceiver 1068, are interconnected using various buses, and several of the components can be mounted on a common motherboard or in other manners as appropriate.

The processor 1052 can execute instructions within the mobile computing device 1050, including instructions stored in the memory 1064. The processor 1052 can be implemented as a chipset of chips that include separate and multiple analog and digital processors. The processor 1052 can provide, for example, for coordination of the other components of the mobile computing device 1050, such as control of user interfaces, applications run by the mobile computing device 1050, and wireless communication by the mobile computing device 1050.

The processor 1052 can communicate with a user through a control interface 1058 and a display interface 1056 coupled to the display 1054. The display 1054 can be, for example, a TFT (Thin-Film-Transistor Liquid Crystal Display) display or an OLED (Organic Light Emitting Diode) display, or other appropriate display technology. The display interface 1056 can comprise appropriate circuitry for driving the display 1054 to present graphical and other information to a user. The control interface 1058 can receive commands from a user and convert them for submission to the processor 1052. In addition, an external interface 1062 can provide communication with the processor 1052, so as to enable near area communication of the mobile computing device 1050 with other devices. The external interface 1062 can provide, for example, for wired communication in some implementations, or for wireless communication in other implementations, and multiple interfaces can also be used.

The memory 1064 stores information within the mobile computing device 1050. The memory 1064 can be implemented as one or more of a computer-readable medium or media, a volatile memory unit or units, or a non-volatile memory unit or units. An expansion memory 1074 can also be provided and connected to the mobile computing device 1050 through an expansion interface 1072, which can include, for example, a SIMM (Single In Line Memory Module) card interface. The expansion memory 1074 can provide extra storage space for the mobile computing device 1050, or can also store applications or other information for the mobile computing device 1050. Specifically, the expansion memory 1074 can include instructions to carry out or supplement the processes described above, and can include secure information also. Thus, for example, the expansion memory 1074 can be provide as a security module for the mobile computing device 1050, and can be programmed with instructions that permit secure use of the mobile computing device 1050. In addition, secure applications can be provided via the SIMM cards, along with additional information, such as placing identifying information on the SIMM card in a non-hackable manner.

The memory can include, for example, flash memory and/or NVRAM memory (non-volatile random access memory), as discussed below. In some implementations, a computer program product is tangibly embodied in an information carrier. The computer program product contains instructions that, when executed, perform one or more methods, such as those described above. The computer program product can be a computer- or machine-readable medium, such as the memory 1064, the expansion memory 1074, or memory on the processor 1052. In some implementations, the computer program product can be received in a propagated signal, for example, over the transceiver 1068 or the external interface 1062.

The mobile computing device 1050 can communicate wirelessly through the communication interface 1066, which can include digital signal processing circuitry where necessary. The communication interface 1066 can provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication can occur, for example, through the transceiver 1068 using a radio-frequency. In addition, short-range communication can occur, such as using a Bluetooth, WiFi, or other such transceiver (not shown). In addition, a GPS (Global Positioning System) receiver module 1070 can provide additional navigation- and location-related wireless data to the mobile computing device 1050, which can be used as appropriate by applications running on the mobile computing device 1050.

The mobile computing device 1050 can also communicate audibly using an audio codec 1060, which can receive spoken information from a user and convert it to usable digital information. The audio codec 1060 can likewise generate audible sound for a user, such as through a speaker, e.g., in a handset of the mobile computing device 1050. Such sound can include sound from voice telephone calls, can include recorded sound (e.g., voice messages, music files, etc.) and can also include sound generated by applications operating on the mobile computing device 1050.

The mobile computing device 1050 can be implemented in a number of different forms, as shown in the figure. For example, it can be implemented as a cellular telephone 1080. It can also be implemented as part of a smart-phone 1082, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of the disclosed technology or of what may be claimed, but rather as descriptions of features that may be specific to particular embodiments of particular disclosed technologies. Certain features that are described in this specification in the context of separate embodiments can also be implemented in combination in a single embodiment in part or in whole. Conversely, various features that are described in the context of a single embodiment can also be implemented in multiple embodiments separately or in any suitable subcombination. Moreover, although features may be described herein as acting in certain combinations and/or initially claimed as such, one or more features from a claimed combination can in some cases be excised from the combination, and the claimed combination may be directed to a subcombination or variation of a subcombination. Similarly, while operations may be described in a particular order, this should not be understood as requiring that such operations be performed in the particular order or in sequential order, or that all operations be performed, to achieve desirable results. Particular embodiments of the subject matter have been described. Other embodiments are within the scope of the following claims.

What is claimed is:

1. A method for generating a lossless representation of a webpage on a client device, the method comprising:
    rendering, by a client device, a webpage to be presented in a web browser at the client device;
    receiving, by the client device, an indication of user input to run a content check on the rendered webpage;
    calling, by the client device and in response to receiving the indication of user input, a scraping function to scrape a document object model ("DOM") of the rendered webpage in the web browser at the client device;
    scraping, by the client device and based on calling the scraping function, a cascading style sheet object model ("CSSOM") of the rendered webpage in the web browser at the client device;
    generating, by the client device, a lossless static object model of the scraped DOM and the scraped CSSOM for the rendered webpage, wherein the lossless static object model combines attributes and information of nodes that are traversed by scraping the DOM and scraping the CSSOM; and
    transmitting, by the client device and to a web content analysis system, the lossless static object model to be used by the web content analysis system to losslessly reproduce, based on the combined attributes and information of the traversed nodes, the rendered webpage in a same rendering as in the web browser at the client device for running the content check on the rendered webpage.

2. The method of claim 1, wherein the rendered webpage is a preview of the webpage.

3. The method of claim 1, wherein the indication of user input includes a reference pointer to a portion of the webpage DOM for which to run the content check.

4. The method of claim 3, wherein the reference is at least one of a link to a preview of the rendered webpage and a DOM root node.

5. The method of claim 3, further comprising:
    calling, by the client device and based on the reference pointer, the scraping function to scrape the portion of the webpage DOM that corresponds to the reference pointer; and
    responsively generating, by the client device, a lossless static object model of the scraped portion of the DOM and the scraped CSSOM.

6. The method of claim 1, further comprising:
    receiving, by the client device and from a computer system, a script including code for scraping a DOM of a webpage at a client device;
    exposing, by the client device, the code as the scraping function; and
    responsively calling, by the client device, the scraping function to scrape the DOM of the rendered webpage in the web browser at the client device.

7. The method of claim 1, wherein the lossless static object model of the scraped DOM and the scraped CSSOM is a flat object model ("FlatOM") of the DOM and the CSSOM of the rendered webpage.

8. The method of claim 1, wherein the lossless static object model of the scraped DOM and the scraped CSSOM is ingested directly into a content check pipeline of the web content analysis system.

9. The method of claim 8, wherein ingesting the lossless static object model of the scraped DOM and the scraped CSSOM directly into the content check pipeline comprises bypassing internal rendering of the DOM and the CSSOM at the web content analysis system.

10. The method of claim 1, wherein the content check is a pre-publish check of the rendered webpage before the rendered webpage is published and presented in web browsers of user devices.

11. The method of claim 1, further comprising:
    receiving, by the client device and from the web content analysis system, results from running the content check for the rendered webpage using the lossless static object model of the scraped DOM and the scraped CSSOM; and
    outputting, by the client device, the results in a plugin to be presented with the rendered webpage in the web browser at the client device.

12. The method of claim 1, wherein the webpage is rendered in a content management service ("CMS") interface presented in the web browser at the client device.

13. The method of claim 12, wherein a CMS plugin is presented with the rendered webpage in the CMS interface, the CMS plugin including results from the web content analysis system running the content check on the rendered webpage.

14. The method of claim 12, wherein the rendered webpage is an editable version of the webpage.

15. A system for generating a lossless representation of a webpage on a client device, the system comprising:
    a client device configured to render webpage content in a web browser at the client device; and
    a web content analysis system in communication with the client device and configured to:
        run at least one content check based on analyzing content of the webpage that is rendered at the client device; and
        generate a plugin for deployment at the client device, wherein the plugin is configured to provide integration between the client device and the web content analysis system,
    wherein the client device is configured to perform operations comprising:
        rendering the webpage to be presented in the web browser at the client device with the plugin;
        receiving an indication of user input to run a content check on the rendered webpage;
        calling, in response to receiving the indication of user input, a scraping function to scrape a DOM of the rendered webpage in the web browser at the client device, wherein the scraping function is provided by the web content analysis system via the plugin;
        scraping, based on calling the scraping function, a cascading style sheet object model ("CSSOM") of the rendered webpage in the web browser at the client device;
        generating a lossless static object model of the scraped DOM and the scraped CSSM for the rendered webpage, wherein the lossless static object model combines attributes and information of nodes that are traversed by scraping the DOM and scraping the CSSOM; and transmitting, to the web content analysis system, the lossless static object model to be used by the web content analysis system to losslessly reproduce, based on the combined attributes and information of the traversed nodes, the rendered webpage in a same rendering as in the web browser at the client device for running the at least one content check on the rendered webpage.

16. The system of claim 15, wherein the client device performs operations further comprising:
receiving, from a computer system, a script including code for scraping a DOM of a webpage at a client device;
exposing the code as the scraping function; and
responsively calling the scraping function to scrape the DOM of the rendered webpage in the web browser at the client device.

17. The system of claim 15, wherein the at least one content check is a pre-publish check of the rendered webpage before the rendered webpage is published and presented in web browsers of user devices.

18. The system of claim 15, wherein the client device performs operations further comprising:

receiving, from the web content analysis system, results from running the at least one content check for the rendered webpage using the lossless static object model of the scraped DOM and the scraped CSSOM; and
outputting the results in the plugin to be presented with the rendered webpage in the web browser at the client device.

19. The system of claim 15, wherein:
the webpage is rendered in a content management service ("CMS") interface presented in the web browser at the client device, and
the plugin is presented with the rendered webpage in the CMS interface, the plugin including results from the web content analysis system running the at least one content check on the rendered webpage.

20. The system of claim 15, wherein the lossless static object model of the scraped DOM and the scraped CSSOM is ingested directly into a content check pipeline of the web content analysis system, wherein the ingesting comprises bypassing internal rendering of the DOM and the CSSOM at the web content analysis system.

* * * * *